United States Patent [19]

Werth

[11] Patent Number: 4,541,115
[45] Date of Patent: Sep. 10, 1985

[54] PATTERN PROCESSING SYSTEM

[75] Inventor: Larry J. Werth, Eagan, Minn.

[73] Assignee: Pattern Processing Technologies, Inc., Minneapolis, Minn.

[21] Appl. No.: 465,008

[22] Filed: Feb. 8, 1983

[51] Int. Cl.³ .............................................. G06K 9/70
[52] U.S. Cl. ....................................... 282/14; 382/23; 382/37
[58] Field of Search .................. 382/7, 10, 14, 15, 37, 382/41, 49, 23; 364/513, 488-491; 358/101, 107

[56] References Cited

U.S. PATENT DOCUMENTS

| | | | |
|---|---|---|---|
| 3,074,050 | 1/1963 | Schultz | 340/146.3 |
| 3,167,746 | 1/1965 | Reines et al. | 340/146.3 |
| 3,504,164 | 3/1970 | Farrell et al. | 235/150 |
| 3,539,994 | 11/1970 | Clapper | 340/146.3 |
| 3,579,252 | 5/1971 | Goodman | 178/7.85 |
| 3,643,215 | 2/1972 | Ingham et al. | 382/37 |
| 3,737,852 | 6/1973 | Robinson | 340/146.3 WD |
| 3,816,722 | 6/1974 | Sakoe et al. | 235/152 |
| 3,846,752 | 11/1974 | Nakano et al. | 340/146.3 Q |
| 3,879,728 | 4/1975 | Wolff | 343/5 MM |
| 3,909,785 | 9/1975 | Howells | 382/37 |
| 4,014,000 | 3/1977 | Uno et al. | 340/146.3 MA |
| 4,028,673 | 6/1977 | Taylor et al. | 340/136.3 R |
| 4,032,889 | 6/1977 | Nassimbene | 340/146.3 E |
| 4,034,343 | 7/1977 | Wilmer | 382/37 |
| 4,110,737 | 8/1978 | Fahey | 340/146.3 Q |
| 4,164,728 | 8/1979 | Marsh | 340/146.3 Q |
| 4,254,400 | 3/1981 | Yoda et al. | 340/146.3 MA |
| 4,277,775 | 7/1981 | Nally et al. | 340/146.3 Q |
| 4,286,330 | 8/1981 | Isaacson | 382/49 |
| 4,295,121 | 10/1981 | Enser et al. | 340/146.3 MA |
| 4,295,198 | 10/1981 | Copeland et al. | 364/515 |
| 4,305,130 | 12/1981 | Kelley et al. | 364/513 |
| 4,499,596 | 2/1985 | Casey et al. | 382/37 |

OTHER PUBLICATIONS

J. S. Griffith *Mathematical Neubiology,* 1971, Chapter 8.

Primary Examiner—Leo H. Boudreau
Attorney, Agent, or Firm—Kinney & Lange

[57] ABSTRACT

A pattern processing system associates image input patterns with desired response codes. The image input is stored in an image buffer as an addressable array of sample values. An address sequencer provides a sequence of addresses (or "address stream") to the image buffer and to a response memory. The next address provided by the address sequencer is based upon the current address and the state of the sample value stored in the image buffer at the location corresponding to the current address. Once the address sequencer repeats an address, the address stream is in a repetitive address loop as long as the image stored in the image buffer remains constant. The address loop continues to be generated, since the address sequencer always produces the same next address based upon the same current address and the same sample value stored at that current address. During a training mode, a pattern to be recognized is supplied to the image buffer and a training code representing a desired response is written into the response memory at selected locations that correspond to addresses in the address loop being generated. During a later recognition mode, when the same pattern is supplied to the image buffer, the same address loop is again generated. The previously stored training codes are read from the response memory. A response detector provides a response code output representative of the pattern based upon the most frequent code read out from the response memory.

30 Claims, 15 Drawing Figures

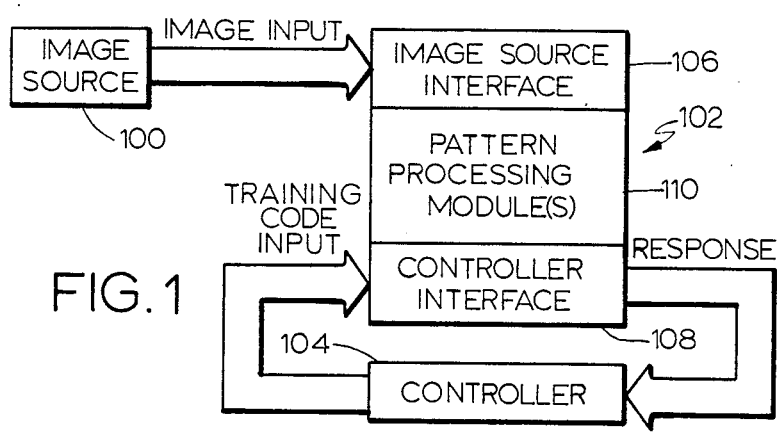
FIG. 1
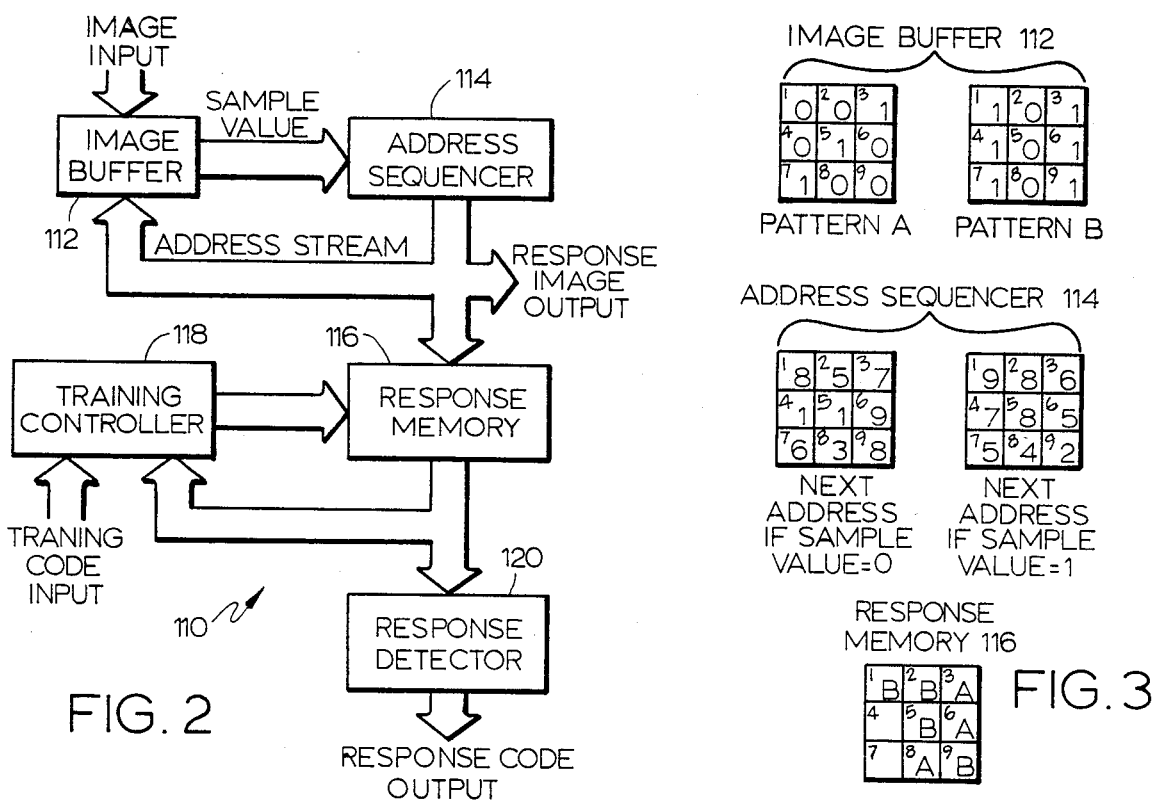
FIG. 2
FIG. 3
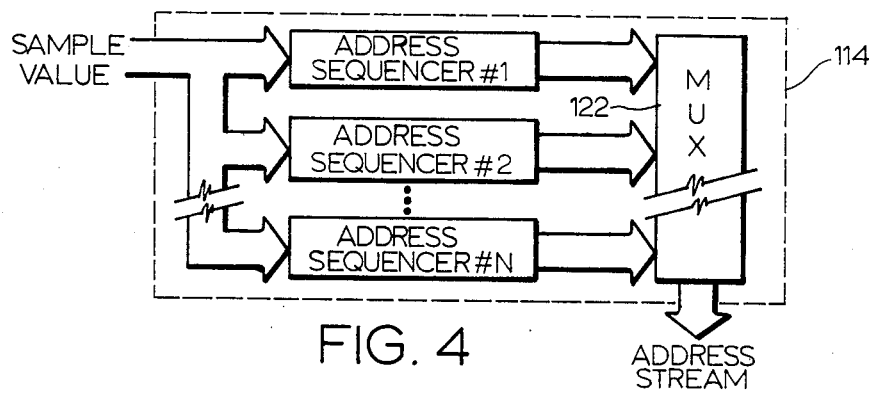
FIG. 4

PATTERN PROCESSING SYSTEM

REFERENCE TO COPENDING APPLICATIONS

Reference is hereby made to the following copending applications filed on even date with this application and assigned to same assignee: ADDRESS SEQUENCER FOR PATTERN PROCESSING SYSTEM, U.S. Ser. No. 06/464,588; TRAINING CONTROLLER FOR PATTERN PROCESSING SYSTEM, U.S. Ser. No. 06/464,350; and RESPONSE DETECTOR FOR PATTERN PROCESSING SYSTEM, U.S. Ser. No. 06/464,624.

BACKGROUND OF THE INVENTION

1. Field of the Invention

This invention relates to systems for identifying images.

2. Description of the Prior Art

Digital electronic technology (and particularly digital computers) has changed almost every facet of modern life. In spite of the ever-increasing use of digital technology, life still goes on in an analog fashion. Visual, tactile, and audio images still comprise the bulk of sensory experiences for human beings. Full exploitation of digital technology has been limited by the ability to convert these analog images to digital data and to distinguish the images from each other.

Converters which can digitize a visual image or a series of sounds are now commonplace. Any audio or visual image can be converted to an array of digital data. The problem is, however, to deal with that data in a meaningful manner.

Conventional pattern or image recognition technology has serious speed limitations which in general originate from the use of conventional digital computer processing architecture. This architecture requires the use of serial processing algorithms which do not easily accommodate large amounts of parallel information.

Two methods are commonly used in the prior art to recognize patterns: "template matching" and "feature extraction". In the template matching method, a reference pattern is stored for each response. Each input image is then compared with each reference pattern until a match is found. The number of reference patterns which can be recognized is obviously limited, since substantial time and memory is required to serially search for a match. Because of practical limitations on speed and memory this technology cannot accommodate applications such as natural speech input, visually guided motion, or object tracking.

The feature extraction method attempts to speed up this process. Rather than match an entire image, a small set of features is extracted from the image and compared to a reference set of features. This method can be very complex, as well as time-consuming. An example of the complexity involved in the feature extraction technique is the problem of recognizing a person's face. The difficulty of defining the features of a person's face mathematically and then writing a procedure to recognize these features in an image is overwhelming.

Most conventional approaches to pattern recognition represent information from images in a format which is incompatible with spatial or temporal integration. For example, each image type or image source typically has unique processing algorithms, and the results are not easily combined. In speech, for example, there is generally no common representation of information for the acoustic level to the word, phrase, or semantic levels (temporal integration). As a result, conventional speech recognition methods typically deal with incompatible information formats at every level. Severe processing demands are made in order to accommodate this situation. In the case of multiple visual images (e.g. one image for each primary color or one image from each camera) the descriptive language (information format) from each image is not easily combined to describe a single image identity (spatial integration). In another more obvious example, the descriptive language typically used for the visual image of an object (areas, perimeters, etc.) is certainly incompatable with the descriptive language for the sound which the object may be producing.

Conventional techniques generally require special computer programming to suit each specific application. Each application frequently requires: a detailed analysis of the expected input images to identify their differences; the development of a model (usually mathematical) to define the differences in computer language; and development of generally complex methods to extract the features from the images. This requires skilled personnel to specify and program the complex algorithms on digital computers, and also requires expensive computer programming development facilities. This development process generally must be repeated for each new type of input images.

In those applications where the input images can be totally specified, conventional technology has generally been successful. An example is the field of optical character recognition, which has been the object of considerable research and development over the past twenty-five years. On the other hand, in those applications which deal with time varying images which frequently cannot be prespecified, the conventional technology either has failed to provide technical solutions, or has resulted in extremely complex and expensive systems.

There is a continuing need for improved pattern recognition systems in many fields including speech recognition, robotics, visual recognition systems, and security systems. In general, the existing pattern recognition systems in these fields have had serious shortcomings which have limited their use.

Existing speech recognition systems generally have the following disadvantages. First, they exhibit "speaker dependence"—only the speakers trained on the system can use it reliably. Second, they typically provide only isolated word recognition—the speaker must pause between words in order to allow adequate processing time. Third, they have small vocabularies—typically less than one hundred words. Fourth, they are very sensitive to extraneous noises. Fifth, they have very slow response times. These properties have greatly limited the desirability and applicability of speech recognition systems.

Some commercially available speech recognition systems offer connected speech or speaker independence. These systems, however, are very expensive and have small vocabularies. None of the presently available speech recognition systems have the capability to accommodate speaker independence, connected speech, large vocabulary size, noise immunity, and real time speech recognition.

Commercially available visual image recognition systems generally do not recognize time varying images. Although systems have been proposed which have a capability of recognizing time varying images, they appear to be very expensive and complex.

The field of robotics provides a particularly advantageous application for pattern recognition. Existing robot applications suffer from too little input of usable information about the environment in which the robot is operating. There is a need for a recognition system which provides recognition of the natural environment in which the robot is operating and which provides signals to the robot control system to permit reaction by the robot to the environment in real time. For example, with visual image recognition on a real time basis, "hand/eye" coordination by a robot can be simulated. This has significant advantages in automated assembly operations. The prior art pattern recognition systems, however, have been unable to fulfill these needs.

Security and surveilance systems typically utilize real time visual input. In many cases, this input information must be monitored on a manual basis by security personnel. This reliance upon human monitoring has obvious drawbacks, since it is subject to human error, fatigue, boredom, and other factors which can affect the reliability of the system. There is a continuing need for pattern recognition systems which provide continuous monitoring of visual images and which provide immediate response to abnormal conditions.

SUMMARY OF THE INVENTION

The pattern processing system of the present invention identifies an image input pattern based upon an address loop which is generated when individual values of the input pattern are addressed sequentially. The system includes image buffer means for storing the image input pattern, address sequencer means for sequentially addressing the image buffer means, and means responsive to the address stream generated by the address sequencer means for identifying the image input pattern based upon the address loop which is generated.

The image buffer means stores sample values representative of the image input pattern in a first array of addressable locations. This first array is addressed by the address stream produced by the addresser sequencer means.

The address sequencer means determines the next address in the sequence based upon at least one preceding address and the sample value(s) which are stored by the image buffer means at the location which corresponds to the preceding address(es). As a result, when an address which has previously been provided in the sequence is repeated, the address stream cycles repetitively through an address loop. Because the next address is always determined by the preceding address and the sample value, the address loop generated is a function of the image input pattern. This address loop is used to identify the image input pattern.

In other words, the basis of the present invention is that a repetitive address loop is generated by the address sequencer means, and that this address loop characterizes the image input pattern which is present. Because the address sequencer means determines the next address of the sequence based upon a preceding address and the sample value stored by the addressable input buffer means at the location corresponding to that preceding address, a repetitive address loop will be produced as long as the input pattern does not change. The particular addresses contained in the address loop are a function of the input pattern, and are used to identify that pattern each time it occurs.

In preferred embodiments, the means responsive to the sequence of addresses includes response memory means, training controller means, and response detector means. The response memory means contains a second array of addressable locations which are addressed by the address stream produced by the address sequencer means. During a training mode, a pattern to be identified is presented, and the training controller means causes a training code to be written into selected locations in the second array which are addressed by the sequence of addresses. The training code represents a desired output response to be produced when that pattern is present.

When the image input pattern is later provided as input to the pattern processing system, the address sequencer means again addresses the first array and the second array. The response detector means provides an output response based upon the training codes which are read out from locations addressed by the address stream.

BRIEF DESCRIPTION OF THE DRAWINGS

FIG. 1 is a block diagram illustrating the pattern processing system of the present invention.

FIG. 2 is a block diagram of a pattern processing module of the pattern processing system of FIG. 1.

FIG. 3 illustrates a simplified example of the operation of the pattern processing module of FIG. 2, including illustrations of two different image input pattens A and B which can be contained in the image buffer, diagrams illustrating the next address produced by the address sequencer depending upon whether the current address location of the image buffer contains a "0" or a "1", and an illustration of the contents of the response memory as a result of operation of the pattern processing module of FIG. 2.

FIG. 4 is a block diagram of a preferred embodiment of an address sequencer for use in the pattern processing module of FIG. 2.

DETAILED DESCRIPTION OF THE PREFERRED EMBODIMENTS

Figure 4A:
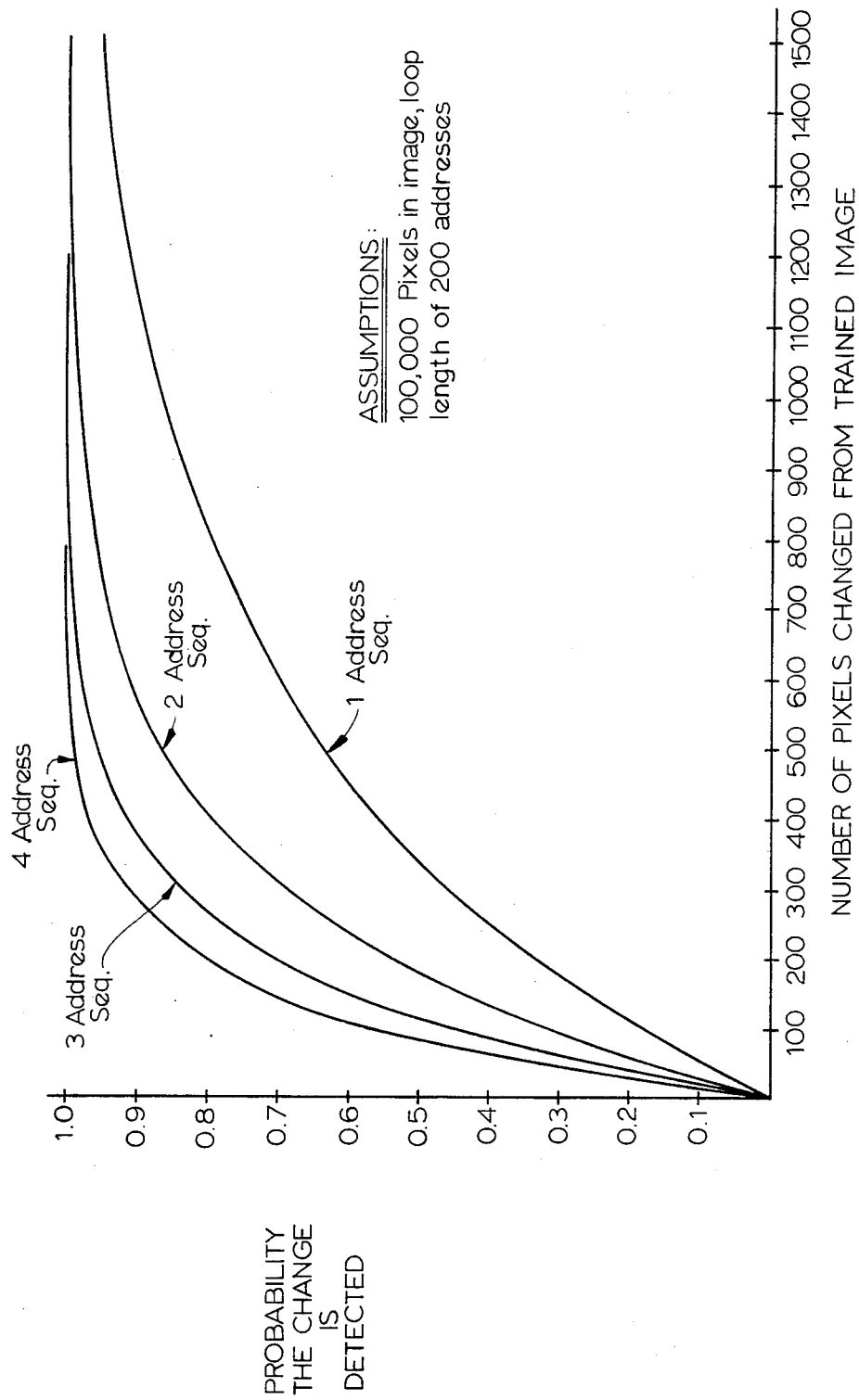
FIG. 4A is a graph illustrating the effect of multiple address sequencers on resolution.

(1) General Description of the Pattern Processing System (FIG. 1)

A preferred embodiment of the pattern processing system of the present invention is illustrated in FIG. 1. The system includes image source 100, pattern processor 102, and controller 104. Pattern processor 102 includes image source interface 106 (which receives image input from image source 100), controller interface 108 (which receives training code input from controller 104, and which provides response output to controller 104), and one or more pattern processing modules 110 (which provide a link between the image input and the desired response output to that image input).

Image source 100 produces the image input in the form of electrical signals. When video images are to be processed, image source 100 is preferably in the form of a video camera which converts optical input to an electrical signal. When the system is used for speech recognition, image source 100 is preferably an audio sensor and frequency spectrum analyzer which converts the acoustic voice input to electrical signals representative of various segments of the frequency spectrum. When the system is used for intrusion detection the image source may be a seismic sensor and frequency spectrum analyzer which convert ground vibrations into electrical signals which again represent segments of the frequency spectrum. When the image to be processed is in the form of tactile imput, image source 100 is preferably an array of transducers which convert the tactile input to electrical signals.

In still other cases the image source is a computer, and patterns are recognized in images stored in computer memory. The images may have been generated by retrieval from mass storage, by graphics systems or by internal programs. In these examples the image represents a collection of data in memory which may not have originated by sensing the natural environment.

The electrical signals representing the image input from image source 100 are converted by image source interface 106 to digital data in the form of an array of digital sample values. Image source interface 106 presents the image input in digital form to one or more of the pattern processing modules 110.

Controller 104 is, for example, a computer which preforms other control functions once the image input has caused a response to be produced by pattern processor 102. For example, in a speech recognition system, the response produced by pattern processor 102 is in the form of digital data representing the word or words that have been recognized. Controller 104 is, in this case, a word processing system which generates and stores text based upon the words formed by the human speech which provided the input to image source 100.

Pattern processor 102 provides the link between image source 100 and controller 104. If a particular image or sequence of images is associated by pattern processor 102 with a particular response during a training mode of operation, pattern processor 102 will reproduce the same response on every recurrence of those images. Pattern processor 102 includes one or more pattern processing modules 110 which reduce the large amount of parallel input data from image source interface 106 at very high speed. Unlike conventional computer processing systems which are used for pattern recognition, pattern processing module 110 of the present invention does not utilize serial processing algorithms. Instead, pattern processing modules 110 utilizes a parallel processing architecture which is not dependent upon computer software, and which is independent of the particular form of image being sensed by image source 100. Associations between the image input and a desired output response are made directly by the hardware of pattern processing module 110, without the use of conventional computer programs or computer processors.

During a training mode, each image which is to be sensed is presented to image source 100. Controller 104 provides a training code input which represents the response which is to be associated by pattern processing module 110 with the particular image input. During the normal pattern identification mode, pattern processing module 110 produces a response based upon the image input provided by image source 100. Whenever an image input is presented to pattern processing module 110 which has previously been presented during the training mode, the particular desired response associated with that image input is again produced by pattern processor 102.

(2) Pattern Processing Module 110 (FIG. 2)

FIG. 2 is a block diagram illustrating a preferred embodiment of a pattern processing module 110 of the present invention. As will be discussed in further detail subsequently, multiple pattern processing modules 110 similar to the module shown in FIG. 2 are, in some embodiments, connected in parallel, in series, or in a combination of parallel and series.

Pattern processing module 110 shown in FIG. 2 includes image buffer 112, address sequencer 114, response memory 16, training controller 118, and response detector 120.

Image buffer 112 is a block of memory storage which stores image input in an array of addressable locations. Image buffer 112 contains enough locations so that each data point (or "sample value") of the image input is individually stored. The sample value stored at each location is, in some cases, a single binary bit, while in other embodiments it is a multi-bit word.

For example, in one embodiment image source 110 is a video camera which produces an electrical signal representative of light intensity at each image segment or "pixel". The image input supplied to image buffer 112 is refreshed at a rate determined by the operating characteristics of the video camera. In preferred embodiments, the refresh rate of the video image input is sufficiently high that the image input supplied to image buffer 112 is presented on a "real time" basis.

Address sequencer 114 is the key component of the pattern processing module 110 shown in FIG. 2. Address sequencer 14 sequentially addresses the image maintained in image buffer 112. As each address produced by the address sequencer 114 causes a location of image buffer 112 to be addressed, the sample value stored at the addressed location is provided by image buffer 112 to address sequencer 114. Based upon the current address and the sample value obtained from that address, address sequencer 114 selects the next address of the address sequence. This selection of the next address is a predetermined feature of address sequencer 114, and is consistent. In other words, each time address sequencer 114 is at a particular current address and receives a particular sample value, it will always sequence to the same next address.

For purposes of clarity, the following description of operation will initially assume that the sample value is a single bit binary value (i.e. either "1" or "0"). The more complex case, in which the sample value is a multi-bit word will be discussed later.

Address sequencer 114 can take several different forms. In one embodiment, address sequencer 114 is a pseudo-random number generator which computes the next address based upon the current address and the sample value. In another embodiment of the present invention, address sequencer 114 is a read only memory (ROM) with associated logic. The ROM contains a next address for each possible input combination (current address and sampled value). In either embodiment, the sampling rules governing operation of address sequencer 114 are consistent. That is, resampling of an address always results in the same next address if the sample value is unchanged. Where the sample value is either a "1" or a "0", address sequencer 114 provides one address if the sample value is a "1" and a different address if the sample value is "0". Each time address sequencer 114 produces a particular address and it receives a sample value of "1", it will always sequence to one predetermined next address. Similarly, whenever the address sequencer 114 is at the particular address and receives a sample value of "0", it will always sequence to another (different) predetermined next address.

The output of address sequencer 114, therefore, is a continuous stream of addresses, and its input is a continuous stream of sample values from image buffer 112. The basis of operation of pattern processing module 110 of the present invention is that an "address loop" will be generated which characterizes the image input pattern which is present. Because the sampling rules which govern the address produced by address sequencer 114 are consistent, once address sequencer 114 repeats an address, it will repeat the same sequence of addresses and will remain in this address loop as long as the image input to image buffer 112 is unchanged.

The generation of address loops by address sequencer 114 and image buffer 112 has important statistical implications which result in a dramatic data reduction. Any arbitrary input pattern, even if it contains a very large number of data points, generates only a very small number of statistically probable address loops. The present invention uses the data reduction provided by the address loops to associate an input pattern with a desired response.

The following statistical analysis assumes that address sequencer 114 is capable of generating addresses between "1" and "X" at random. It is also assumes that an image input pattern containing X sample values is stored in image buffer 112, so that for each address generated by address sequencer 114, there is only one next address.

In the following equations and in Table 1, the following definitions apply:

X = Sequencer size, i.e. the number of addresses.
$Y_X$ = Expected number of addresses in loops.
$y_{X}^{i}$ = Expected number of addresses in loops of length i.
$Z_X$ = Expected total number of loops.
$z_{X}^{i}$ = Expected total number of loops of length i.

For any given number of addresses (X), it is possible to determine statistically the expected number of addresses in loops ($Y_X$) and the expected total number of loops ($Z_X$). From the definitions above, the following relations are derived:

$$y_{X}^{i} = iz_{X}^{i} \qquad \text{Eq. (1)}$$

$$Y_X = \sum_{i=1}^{X} y_{X}^{i} \qquad \text{Eq. (2)}$$

$$Z_X = \sum_{i=1}^{X} z_{X}^{i} \qquad \text{Eq. (3)}$$

If a sequencer address is selected at random, the probability $P_{X}^{i}$ that it is part of a loop length i is given by:

$$p_{X}^{i} = \frac{X-1}{X} \cdot \frac{X-2}{X} \cdot \ldots \cdot \frac{X-i+1}{X} \cdot \frac{1}{X} \qquad \text{Eq. (4)}$$

This is because there must be i-1 successor addresses in the loop which are different from the one selected, and the final successor address must close the loop.

The total number of expected addresses in loops is:

$$y_{X}^{i} = Xp_{X}^{i} = \frac{(X-1)!}{X^{i-1}(x-i)!} \qquad \text{Eq. (5)}$$

Substituting Eq. (5) into Eqs. (2) and (3):

$$X = \sum_{i=1}^{X} \frac{(X-1)!}{X^{i-1}(X-i)!} \qquad \text{Eq. (6)}$$

$$Z_X = \sum_{i=1}^{X} \frac{(X-1)!}{iX^{i-1}(X-i)!} \qquad \text{Eq. (7)}$$

Using Eqs. (6) and (7), it is possible to calculate the expected number of addresses in loops $Y_X$ and the expected total number of loops $Z_X$ for any given number of addresses X. TABLE 1 lists the values of $Y_X$ and $Z_X$ for values of X ranging from 10 to 1,000,000.

TABLE 1

| Total Number of Addresses X | Expected Number of Addresses in Loops $Y_X$ | Expected Number of Loops $Z_X$ |
| --- | --- | --- |
| 10 | 3.66 | 1.91 |
| 100 | 12.2 | 2.98 |
| 1,000 | 39.3 | 4.20 |
| 10,000 | 125 | 5.24 |
| 100,000 | 396 | 6.39 |
| 1,000,000 | 1253 | 7.54 |

From TABLE 1, the dramatic reduction in data achieved by utilizing the present invention is apparent. If the input image contains 1,000,000 sample points (i.e. X=1,000,000), only 7.54 possible different loops are statistically expected. The total number of addresses expected to occur in these loops in only 1253, which is a small percentage of the total number of sample points contained in image buffer 112. These loop addresses, however, characterize the total pattern, since the addresses generated by address sequencer 112 are randomly scattered throughout the pattern.

The present invention utilizes the unique characteristics of address loop generation to associate a desired response with an image input. This association is based upon the address loop generated by the particular image input pattern.

As shown in FIG. 2, response memory 116 also receives the address sequence generated by address sequencer 114. Response memory 116 is a block of read/-write memory which contains an array of storage locations which is in one embodiment equal in size to the image buffer. In other embodiments, response memory 116 may not be equal to image buffer 112. It may be larger than image buffer 112 if the address stream to image buffer 112 is scaled down (as described in Section (6)) or it may be less than image buffer 112 if the address stream to response memory 116 is scaled down by a fixed amount. In either case the size of response memory 116 is selected depending upon the number of different responses required by the application. In another embodiment an additional response memory response detector and training controller are added to provide an independently trained response and additional response capacity. It operates on the address stream in parallel.

Training controller 118 receives the training code input and selectively supplies that training code input to response memory 116 during the training mode of operation. As response memory 116 is sequentially addressed by the addresses from address sequencer 114, training controller 118 selectively causes the training code input to be written into locations of response memory 116 which are addressed. The training code input represents the response which is to be associated with the particular image input supplied to image buffer 112. In order to conserve space in response memory, training controller 118 typically writes the training code input into only a fraction of the addresses of the loop—just enough so that the desired response is generated later when the same image input pattern is present in image buffer 112.

In the preferred embodiment shown in FIG. 2, the response memory 116 output is fed back to training controller 118 to ensure that the training code is being written into a sufficient number of memory locations within response memory 116 to ensure that response detector 120 will provide the proper response code output for a given image input.

During normal operation, an image input is supplied to image buffer 112. Address sequencer 114 begins generating the address stream, while receiving sample values from image buffer 112. The address stream generated by address sequencer 114 quickly enters an address loop, which is a function of the image input pattern.

The address stream produced by address sequencer 114 is also being supplied to response memory 116, and the training code stored at each addressed location of response memory 116 is read out to response detector 120. Because the same address can be expected to have been used in more than one loop, the training codes being read out from response memory 116 as a result of the address sequence from address sequencer 114 typically will not be a single response. Response detector 120 receives the codes read out from response memory 116, and determines which response was generated most frequently. Response detector 120 generates a response code output which identifies the image input.

In the embodiment shown in FIG. 2, the outputs of pattern processing module 110 also include a response image output, which is the address stream generated by address sequencer 114. The response image output represents a dramatic reduction in data from the data contained in the image input. As illustrated in TABLE 1, an image input consisting of an array of 1,000,000 sample values generates an expected total of only 1253 possible addresses in loops. Thus the response image output of pattern processing module 110 is a stream of digital data which is uniquely related to the image input, but which contains far less data. As will be discussed in further detail later in conjunction with FIGS. 4 and 5, the response image output from one or more pattern processing module 110 can be used as image input to an image buffer of a subsequent pattern processing module 110. By combining the response image outputs of several modules as the input to the image buffer of a subsequent module, spatial integration of the images presented to modules is achieved. By storing the response image output over time, temporal integration is achieved. In effect, the response image outputs produced by one module 110 over a period of time during which the image input to that module has changed achieves superpositioning of the response image outputs in time at the input to a subsequent module. This is particularly advantageous in speech recognition, where each subsequent pattern processing module 110 covers a broader time window (for example phonetics, syllables, words and phrases of speech).

(3) Simplified Example of Operation (FIG. 3)

To illustrate the operation of the pattern processing module 110 of FIG. 2, an extremely simple example illustrated in FIG. 3 will be used. In this simple example, it is assumed that image buffer 112 stores the image input in the form of a nine-bit binary pattern, and that the pattern processing module is expected to distinguish between "Pattern A" and "Pattern B" shown in FIG. 3. Pattern A contains "1" at address Nos. 3, 5 and 7; and "0" at address Nos. 1, 2, 4, 6, 8 and 9. Pattern B contains "1" at address Nos. 1, 3, 4, 6, 7 and 9; and "0" at address Nos. 2, 5 and 8.

FIG. 3 also includes an illustration of the next addresses generated by address sequencer 114, depending upon whether the sample value from image buffer 112 is "0" or "1". For example, if address No. 2 contains a "0", the next address generated by address sequencer 114 is address No. 5. If the sample value at address No. 2 is a "1", the next address generated by address sequencer 114 is address No. 8.

In the single example, it is also assumed that address sequencer 114 begins with address No. 1. When Pattern A is present in image buffer 112, address sequencer 114 generates the following address stream: "1, 8, 3, 6, 9,8, 3, 6, 9, 8 . . . ." The address loop which is generated is "8, 3, 6, 9". For this example, the same address loop is generated regardless of where address sequencer 114 starts. After several addresses have been produced, eventually address sequencer 114 reaches address No. 8. It then locks in on the sequence "8, 3, 6, 9 . . . " and will remain in that address loop as long as Pattern A is present.

In the case of Pattern B, address sequencer 114 generates the following address stream: "1, 9, 2, 5, 1, 9, 2, 5, 1 . . . ." The address loop generated is "1, 9, 2, 5".

During training, a training code input of either "A" or "B" is written into response memory 116 by training controller 118. In this example, it is assumed that Pattern A was presented first during training. It is further assumed that training conroller 118 causes the training code input to be stored at all locations of response memory 116 which are addressed. In this example, therefore, training code "A" is written into locations 1, 8, 3, 6 and 9 because the sequence of addresses began with address No. 1, and because the remaining addresses all constitute part of the address loop.

In actual applications, assignment of training codes to transition addresses (addresses before entering a loop address) can easily be avoided or minimized. First, the input pattern is generally presented before training is initiated through controller 104 and therefore, due to the speed of the address sequencer 114, a loop would already have been generated. Second, in an application where the input pattern may be changing during training, a periodic (in time) assignment of the training code can be selected and, since loop addresses occur repeatedly and transition addresses do not, most of the training code assignments will be to addresses in loops.

When Pattern B was presented subsequently during training, the training code input "B" was written into response memory 116 by training controller 118 at locations 1, 9, 2 and 5. In this case, training controller 118 caused the training code "B" to be written over the previously stored training code "A" at address No. 1 and address No. 9.

The contents of response memory 116, after training has been completed, is illustrated in FIG. 3. Training code "A" is stored at address Nos. 3, 6 and 8, while training code "B" is stored at address Nos. 1, 2, 5 and 9.

In this example, the image input is presented during normal operation in the form of either Pattern A or Pattern B. The sequential addressing of image buffer 112 and response memory 116 is again performed by address sequencer 114. If Pattern A is present, address sequencer 114 again generates the address loop "8, 3, 6, 9, 8, 3, 6, 9, 8 . . . ." This causes the response memory 116 to be read out as "A, A, A, B, A, A, A, B, A . . . ."

If Pattern B is present, address sequencer 114 again generates the address loop "1, 9, 2, 5, 1, 9, 2, 5, 1 . . . ." The output of response memory 116 is then "B, B, B, B, B, B, B, B, B . . . ".

Response detector 120 monitors the output of response memory 116, and determines which of the two codes read out from response memory 116 was produced most frequently. When Pattern A was presented to image buffer 112, the output of response memory 116 was most frequently "A". When the image input to image buffer 112 was Pattern B, the output of response memory 116 is most frequently "B". Response detector 120 provides the response code output of either "A" or "B" depending upon the frequency of occurrence of the particular code read out from response memory 116.

From this simple example, it can be seen that the present invention provides an association between a training code input and an image input which causes pattern processing module 110 to generate the same response code whenever the same input image is presented to the image buffer 112. Of course, in practical applications, the number of sample values of the image input is much greater than the nine values which are used in the example of FIG. 3, and both image buffer 112 and response memory 116 are capable of storing much larger arrays of data. Also, more than one address loop may be possible for a particular image input (e.g. 7.5 loops are expected for an image of 1,000,000 samples) in which case response memory adresses in each loop would be assigned the training code. The operation described in this example, however, applies to larger input images as well. TABLE 1 shows that even for very large arrays of image input sample values, the expected number of addresses in loops is very small.

It can be seen that the association of a desired response (in the form of a training code input) with a particular image input is not dependent upon any complicated or specialized computer software. In fact, the association between the training code input and the image input is provided by hardware, and is independent of the particular source of the image input (visual, audio or tactile). This makes the pattern processing system of the present invention applicable to a wide variety of different pattern recognition tasks.

An important advantage of the present invention is the modular nature of the pattern processing module 110. This allows pattern processing module 110 to be connected in a variety of different configurations depending upon the general requirements of the recognition task.

Figure 4B:
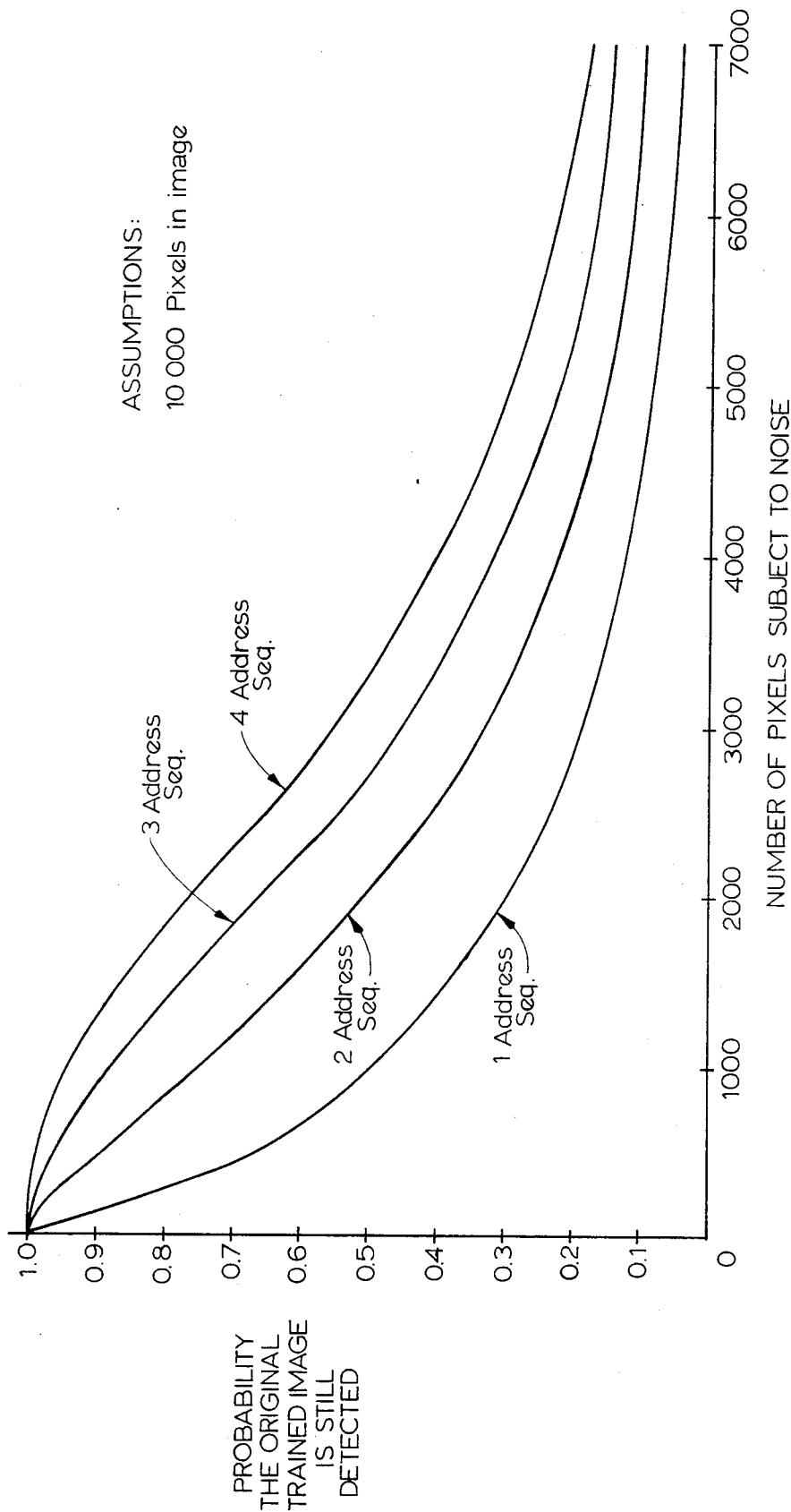
FIG. 4B is a graph illustrating the effect of multiple address sequencers on noise immunity.

(4) Multiplexed Address Sequencers (FIGS. 4, 4A and 4B)

In the description of pattern processing module 110 of FIG. 2 and in the simplified example discussed in FIG. 3, address sequencer 114 generates a single address loop for any given input pattern. Greater resolution and immunity to noise in the image can be achieved, however, if multiple address sequencers address the same input pattern. When this occurs, one address loop will be generated for each address sequencer which is addressing the input pattern.

FIG. 4 illustrates an embodiment of address sequencer 114 which includes multiple address sequencers labeled "Address Sequencer No. 1" through "Address Sequencer No. N". Each address sequencer receives its sample value from image buffer 112. The addresses generated by the various address sequencers are multiplexed by multiplexer 122 to form the address stream. Each individual address sequencer operates independent of the others, and preferably generates a different address loop for the same input pattern. As a result, the multiplexed address stream generates a total of N address loops for each input pattern. This significantly increases resolution because a greater number of sample values are required to generate multiple loops and therefore a greater sensitivity to changes in sample value exists.

Resolution can be specified by a curve showing the number of sample values changed in an image vs. the probability that the change will be detected by the address sequencer(s). Ad address sequencer will detect a change when any one or more of the sample values in its loop has changed because it will be bumped out of its address loop. This would result in a significant change to the response codes read from the response memory 116 and therefore would be detected by the response detector 120. The effect of small percentage changes on the image are amplified at the response detector 120 as address sequencers are "bumped" out of their trained loops. The resolution curve is a plot of the probability any arbitrarily selected set of addresses will include one of the addresses in an address loop. Since a greater number of addresses are in address loops for multiple address sequencers vs. one address sequencer, this probability increases accordingly (see FIG. 4A).

Once the loops are bumped out of their trained loops an immunity to noise is exhibited by the tendency for the address sequencer to overlap addresses in the original address loop depending upon the percentage of sample values changed. Immunity to noise can be specified by a curve showing the percentage of sample values changed in an image vs. the probability that the original image can still be detected. The response detector 120 can detect the original responee code if any one address sequencer generates a loop which overlaps the original trained addresses significantly greater than would be expected by a random selection of the same number of addresses. An example of a noise immunity curve is given in FIG. 4B.

Use of more than one address sequencer results in both higher resolution and higher noise immunity. However, since the address sequencers are multiplexed, a proportional decrease in speed of recognition will occur.

In addition to improvements in noise immunity and resolution, multiplexed address sequencers are used for recognition of grey level images, i.e. images where each sample can have more than two values. In this case each grey level has at least one address sequencer assigned to it. For example, if there are sixteen potential magnitudes (grey levels) to each sample value, at least sixteen address sequencers would be operating. The input image at each level would still be binary. That is, a sample value for any one address sequencer would be "1" or "0" depending upon if the grey level at that pixel was above or below a reference grey level. Additional description of grey level operation is given in section (10)(E).

Figure 5:
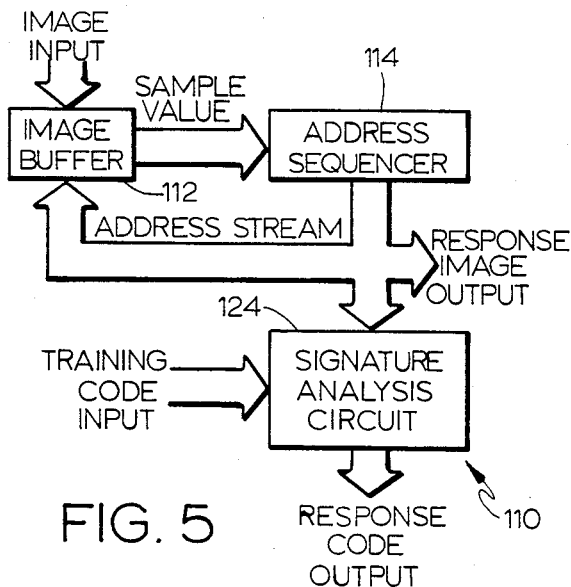
FIG. 5 is a block diagram of another embodiment of the pattern processing module.

(5) Alternative Embodiment of Pattern Processing Module 110 (FIG. 5)

As discussed previously, the present invention is based upon the significant data reduction which is provided by the address loops created when address sequencer 114 addresses image buffer 112. FIG. 2 shows a preferred embodiment of pattern processing module 110, in which the address stream is used to generate a response code output identifying the image input and which includes response memory 116, training controller 118, and response detector 120. Other techniques for converting the addresses of an address loop to a response code output are also possible. FIG. 5 shows another embodiment of pattern processing module 110 of the present invention in which the address stream generated by address sequencer 114 in conjunction with image buffer 112 is converted to a response code output by signature analysis circuit 124. The conversion of a stream of data to a single code is typically performed in currently available signature analysis circuits. In the embodiment shown in FIG. 5, signature analysis circuit 124 is used to take the address stream from address sequencer 114 and convert the address loops (i.e. periodic address sequences) to a single response code output. The particular response code output assigned to a particular loop or loops by signature analysis circuit 124 is based upon the training code input.

Another technique for response detection is to monitor individual bit positions in the codes read from the response memory and generate a response code based upon the rate of occurrence of "1's" or "0's" at each bit position. For example, if each bit position corresponds to a specific type of response, then a response code can be detected by setting to "1" the bit position with the maximum "1" rate.

Figure 6:
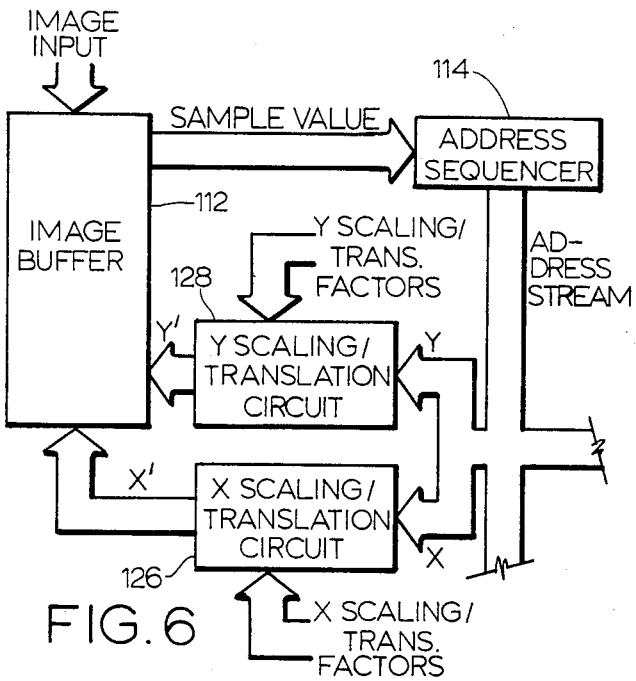
FIG. 6 is a block diagram of a portion of the pattern processing module illustrating an embodiment which provides scaled and translated addressing.

(6) Scaling and Translation of the Address Stream (FIG. 6)

In some applications, it is advantageous to scale or translate the address stream from address sequencer 114 so that the actual address stream applied to image buffer 112 differs in a predetermined manner from that generated by address sequencer 114. The scaling or translation is used, for example, to window-in on a subregion within the total image, so that the identification of the image is based upon the sample values within the subregion.

An important property of windowing is that the address sequencer(s) 114 continue to sequence independent of the window location in the image. That is, an image of an object can result in the same address loops regardless of the object's location or size in the image by locating the window consistently around the object. For example, sealing or translation can be used to track objects moving within an image by adjusting scale factors and translation factors to maintain maximum recognition response. Another example is to recognize a person's face even though the person is at different distances from the camera and therefore projects a different object size on the image.

In the case of multiplexed address sequencers, each sequencer may be assigned a subregion by scaling and translating each sequencer separately. Each sequencer can therefore contribute regional information to the recognition of the total image. This is a form of spatial integration as discussed later in section (8).

FIG. 6 shows a portion of pattern processing module 110 which includes image buffer 112, address sequencer 114, X scaling/translation circuit 126, and Y scaling/translation circuit 128. In this embodiment, image buffer 112 is an X/Y addressable array, where each input value of the array is defined by an X address and a Y address. In this embodiment, each address of the address stream from address sequencer 114 is a composite address containing both an X and a Y component. For example, in one embodiment the address from address sequencer 114 is a sixteen bit word, with the lower eight bits representing the X address and the upper eight bits representing the Y address. The X component of the address is provided to X scaling/translation circuit 126 to produce address X; while the Y component is provided to Y scaling/translation circuit 128 to produce address Y. Each component is divided by a scaling factor to provide scaling. In some cases, scale factors can originate from transcendental functions (e.g. sine and cosine) which can result in a rotation of the window. Translation is provided by adding (or subtracting) a translation factor. The scaling and translation factors are provided by the operator through, for example, controller 104 (FIG. 1). In a preferred embodiment of the present invention, X scaling/translation circuit 126 and Y scaling/translation circuit 128 use high speed integrated circuit chips used for arithmetic functions (i.e. add and subtract, multiply and divide, sine and cosine).

(7) Other Embodiments of Pattern Processing Module 110

Because the present invention provides an extremely powerful method of data reduction from input patterns, it is applicable to a wide range of pattern processing applications. These include speech recognition, robotics, visual recognition systems, security systems, as well as many other applications where identification of images is required. Because the applications of the present invention are far-ranging, the particular form of the present invention may differ somewhat depending upon unique characteristics of the application. Nonetheless, the generation of a new address which causes the image to be addressed and which is function of the sample value obtained in response to a previous address is used in each application. For example, in some applications image source 110, the image source interface 106, and image buffer 112 may be integrated into a single device in which the sensing elements of the device are themselves addressed. One such embodiment utilizes a Vidicon camera, where the address stream is separated into X and Y components (as in FIG. 6) and those components are then converted to X and Y electron beam deflection voltages by digital-to-analog converters.

In some applications, address sequencer 114 generates the next address (or addresses) based on more than one sample value and more than one previous address. For example, in some applications a neighborhood of sample points are addressed, and address sequencer 114 generates the next address (or addresses) based upon the collective sampled value.

In some cases, it is advantageous to consider the difference between sample values along a horizontal or vertical line (or in a neighborhood) as the sample value. This can be important, for example, in recognizing textures and edges of objects.

In still other applications, the "sample value" used in determining the next address is the change in the value at the addressed location. This is used where time varying images are involved. The image input pattern in this case is essentially the differential of two images, rather than an image itself.

If FIG. 2, image buffer 112 and response memory 116 are shown as separate blocks of a block diagram. In some applications, image buffer 112 and response memory 116 can be combined into one memory block. This is the case if image buffer 112 and response memory 116 are the same size and if there is no scaling (as was described in FIG. 6). In that case, the combined memory block contains a multibit word at each addressable location, with a portion of each word used as image buffer 112 and another portion of the word used as response memory 116. The first array of addressable locations representing image buffer 112 and the second of addressable locations representing response memory 116 are, in this case, superimposed in a single block of memory.

Figure 7:
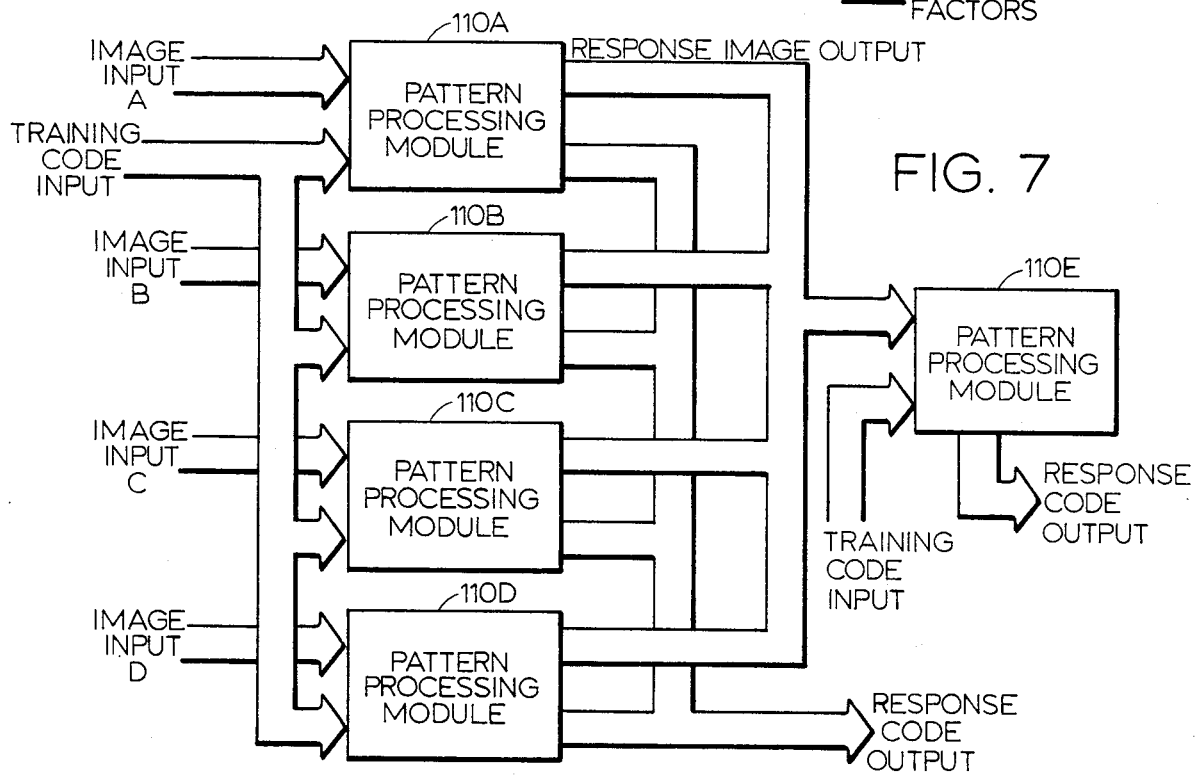
FIG. 7 is a block diagram showing pattern processing modules connected to provide spatial integration of four image inputs.

(8) Spatial Integration (FIG. 7)

In general, spatial integration refers to the recognition of the whole image as contributed by the recognition of its parts. In this case the recognized parts are represented by address loops generated by address sequencers. Each address sequencer may be operating on a different image and each can contribute independently to the total recognition task.

Spatial integration may take different forms. One form, described in Sections 4 and 6, combines the address stream from each address sequencer by multiplxing them and using a single response memory, response detector, and training controller. The sequencers may be processing the same or different images but the total recognition and training task is combined.

Another form of spatial integration is given in FIG. 7. In this embodiment of the present invention, four pattern processing modules 110A, 110B, 110C and 110D are connected in parallel to provide spatial integration of four different image inputs: image input A, image input B, image input C and image input D. It differs from the previous form because integration occurs at the image input buffer of another pattern processing module (110E) rather than at the response memory. The address stream, also called the response image output, from each of the modules A, B, C, D is multiplexed and each address sets a bit in the image buffer of 110E. Address loops present in the address streams are essentially projected as a binary image at the input to pattern processing module 110E. This pattern processing module 110E is then trained to recognize the total pattern which has been generated by all the contributing patterns. In some applications image inputs A-D can come from different image sources, such as visual, tactile and speech sources. Similarly, in other embodiments image inputs A-D represent different image types, such as difference images, static images, edge detection images, or images generated by each of the three primary colors. In still other embodiments, image inputs A-D repesent multiple small regional images which are components of a much larger total image.

The response image output of each pattern processing module represents a uniquely encoded representation of the image input. As discussed previously, a major data reduction occurs between the image input and the response image output, since the address loop contains only a small fraction of the total number of sample values in the image input. This data reduction allows superpositioning of the response image outputs of pattern processing modules 110A–110D to achieve spatial integration of image inputs A-D.

As shown in FIG. 7, the response image outputs of pattern processing modules 110A–110D are supplied to pattern processing module 110E as its image input. Each address contained in the response image outputs of modules 110A–110D is set to a binary "1" state in the image buffer of pattern processing module 110E. In this way, the response image outputs of modules 110A–110D are converted to an image input which is then processed by pattern processing module 1110E. A training code input is supplied to pattern processing module 110E, and is associated with the particular input pattern created by the superimposed response image outputs of modules 110A–110D.

In some cases, image inputs A-D of FIG. 7 can be the same image. In this case, the use of pattern processing modules 110A–110D in parallel increases pattern recognition resolution and also increases the potential response vocabulary, since each module 110A–110D can have its own response memory and can contribute to the vocabulary independently. A larger response vocabulary and greater pattern recognition resolution can be accomplished simply by adding more pattern processing modules operating in parallel on the same image.

In the particular embodiment shown in FIG. 7, pattern processing modules 110A–110D are shown as receiving a training code input, and as producing response code output. In some cases, the response code outputs from modules 110A–110D are not needed, and only the response code output from pattern processing module 110E is utilized. In that case, the training code inputs to modules 110A–110D and the response code outputs from modules 110A–110D are not used, and in fact the response memory, response detector and training controller could be deleted from these modules to reduce the amount of hardware required.

In other embodiments, the response code output from modules 110A–110D is used, and in that case the training code input to each of those modules is required. The use of response code outputs from both the first level (modules 110A–110D) and the second level (module 110E) is particularly useful in speech recognition systems, for example, where both spatial and temporal integration are utilized and a hierarchy of recognition levels is required.

Figure 8:
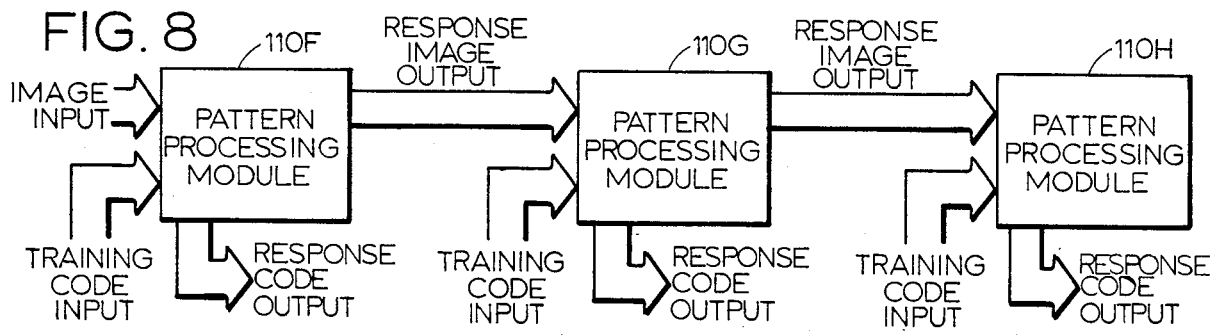
FIG. 8 is a block diagram showing pattern processing modules connected to provide temporal integration of a time varying image input.

(9) Temporal Integration Using Multiple Pattern Processing Modules (FIG. 8)

FIG. 8 shows another configuration utilizing pattern processing modules 110F, 110G and 110H which are connected in series to provide temporal integration. In the embodiment shown in FIG. 5, the image input is supplied to pattern processing module 110F. The response image output of module 110F is provided as the image input to pattern processing module 110G. Module 110G receives the response image output from module 110F as its image input. The response image output from module 110F is loaded into the image buffer of module 110G over a longer time period than is used by module 110F in loading the image input into its image buffer. In other words, module 110G operates over a broader time window (or temporal interval) than module 110F.

The response image output of pattern processing module 110G is supplied as the image input to module 110H. The time period over which the response image output from module 110G is loaded into the image buffer of module 110H is longer than the period used by module 110G to accumulate and load the response image output from module 110F into the image buffer of module 110G. Thus module 110H operates over a broader time window than module 110G. Generally temporal integration at each level continues until the pattern accumulated at the image input is recognized as a trained pattern.

Speech recognition applications require temporal integration in order to recognize phonems, syllables, words and phrases of speech. Utilizing the present invention as illustrated in FIG. 8, pattern processing module 110F can, for example, detect phonems, module 110G can detect syllables based upon those phonems, and module 110H can detect words based upon those syllables.

Another type of temporal integration occurs during sequential windowing of an image (windowing was described in section (6)). One pattern processing module, for example, may sequentially window various regions of an image to accumulate properties of that image at the image input of the next level processing module. The accumulated pattern is then recognized as the total image. One example involves recognizing a person's face by windowing in on features such as eyes, nose, mouth, etc. and accumulating a detailed description to be recognized by the next level processing module.

The present invention provides great versatility and adaptability to a wide variety of different recognition tasks. By selective interconnection of pattern processing modules 110, spatial integration, temporal integration and resolution requirements can easily be mixed and configured by the user to a particular application need.

Feedback connections of the modules 110 can also be configured from higher level modules to lower level modules to provide context dependent recognition. This is important in recognition tasks for which the information at lower levels (i.e. closer to the initial image input) alone is insufficient for recognition—the context in which the image occurs must also be considered. This also is a common situation in speech recognition, which is easily accommodated with the present invention.

(10) Video Inspection and Monitoring System (FIGS. 9–12)

In the previous discussion, the pattern processing system of the present invention has been described in general terms, which has been necessary since the present invention has applicability to a wide range of different pattern processing requirements. These include speech recognition, visual image recognition, robotics, and security and surveillance. The following discussion will deal specifically with one advantageous application of the present invention to visual monitoring.

Figure 9:
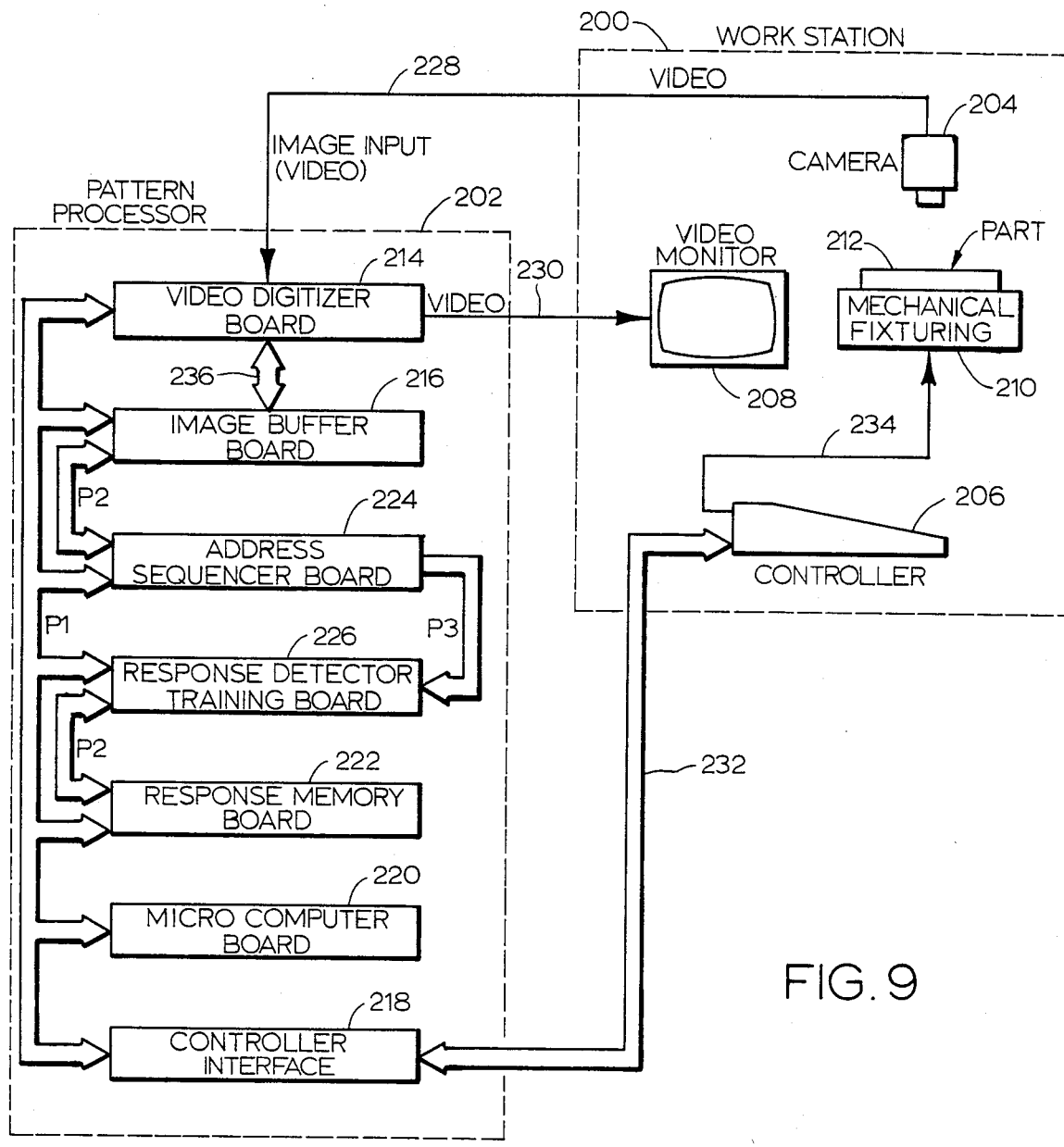
FIG. 9 is a block diagram of a video image processing system which includes a preferred embodiment of the pattern processor of the present invention.

FIG. 9 shows a preferred embodiment of a system utilizing the present invention for video inspection and monitoring. The system of FIG. 9 includes work station 200 and pattern processor 202. Work station 200 includes video camera 204 (which acts as an image source, controller 206, video monitor 208, mechanical fixturing 210, and part 212 (which is manipulated by mechanical fixturing 210 and is monitored by means of video camera 204). Pattern processor 202 includes seven printed circuit boards (video digitizer board 214, image buffer board 216, controller interface board 218, microcomputer board 220, response memory board 222, address sequencer board 224, and response detector/training board 226).

Analog video signals are supplied by video camera 204 to video digitizer board 214 by cable 228. Analog video signals are supplied to video monitor 208 from video digitizer board 214 by cable 230.

Cable 232 provides communication back and forth between controller 206 at work station 200 and controller interface board 218 of pattern processor 202. Controller 206 also provides control signals to mechanical fixturing 210 to control mechanical manipulation part 212 through control lines 234. Controller 206 preferably includes a keyboard (not shown) which allows the operator to enter data, training codes, and other control information, and to select operating modes.

The work station 200 operates in one of two modes: a training mode or an operating mode. In the training mode, the operator is teaching pattern processor 202 the task to be performed. Three examples of operating are: visual monitoring of a continuous process, visually guided movement, or part inspection for defects. Many applications of the present invention require all three types of tasks to be performed.

In the visual monitoring task, the operator has trained pattern processor 202 to monitor a continuous process or sequence of processes and respond by directing the process, or to detect deviations from normal operation. In many applications, this involves monitoring a high speed process and responding immediately to malfunctions, such as parts becoming jammed.

The operator can train pattern processor 202 for the visual monitoring task as follows:

First, the operator sets up video camera 204 and observes the critical process to be monitored on video monitor 208.

Second, the operator uses controller 206 to place pattern processor 202 in the training mode. The operator selects a training code to designate normal operation and assigns it to pattern processor 202 by entering this information through the keyboard of controller 206.

Third, the operator begins the process and allows normal training codes to be assigned to pattern processor 202 during all normal functioning processes.

When the operating mode is selected, deviations from the normal functions are quickly detected by pattern processor 202 and appropriate action (e.g. in the form of control signals to a mechanical fixturing 210 or a visual or audible annunciator signal) is taken by the controller 206.

For the task of visually guided movement, input patterns can be associated with response codes which command a movement of, for example, part 212, a tool (not shown), or camera 204. In many applications part 212 cannot be adequately positioned by fixturing 210 for subsequent operation such as assembly, or inspection because of limited fixturing tolerances. In those cases, pattern processor 202 can be trained to respond with a code representing the magnitude and direction of the displacement required to correct the positions of part 212 or camera 204.

The operator can choose to train the pattern processor 202 for this task in two ways. First, part 212 can be physically moved through its extremes of anticipated displacement and codes for these displacements and magnitudes can be trained. Second, a program can be written for the controller 206 which uses translation and scaling to position a window over part 212. In this case, the displacement of the window is equivalent to the physical displacement of part 212 and the program automatically assigns training codes representing these displacements; no physical movement of part 212 is required in this case. During operation, when part 212 becomes positioned within the trained displacement tolerances, part 212 or camera 204 can be directed into position by controller 206.

Since pattern processor 202 can be trained to respond with an object's identity and its displacement at high speeds, pattern processor 202 can provide the necessary responses for controller 206 to identify and track a moving object. In this visually guided movement task, controller 206 maintains a maximum response of the object's identity code by directing movements to compensate for the displacements. One application is to identify and track a moving target in surveilence applications.

In another visually guided movement task each visual image of an object is trained to respond with a code directing the next move of that object. In this case visually guided motion can provide proper alignment for mating parts in automated assembly operations or, for example, to move a tool to a specific point on a part. One such application utilizes a robot arm with a camera mounted on it. The camera visually guides the arm to a precise assembly point and then visually guides a tool for assembly operations.

The operations of training and response detection of codes for displacement and of training and response detection of codes for part identification or inspection can be kept independent by providing two sets of response memory, response detectors and training controllers using the same address sequencer. This provides additional capacity for response codes and segregates the two functions into a more parallel operation.

For a visual inspection task, such as inspection of a part 212 (e.g. an assembled printed circuit board), the operator can train pattern processor 202 as follows.

First, a correctly completed circuit board is selected to be used as a training part. The operator observes the monitor 208 and places the board in a position to be defined as the reference or registered position; probably in the center of the field of view of camera 204. The field of view of camera 204 is adjusted so that it is large enough to include the anticipated variations in positioning of the board.

Second, the operator provides a training code to controller 206 which identifies the board in its registered position. If it is the only board to be inspected the code may only designate that the board is present and in position.

Third, the anticipated limits in board positioning tolerances are provided to controller 206 and a controller program is initiated that automatically trains codes identifying the magnitude and direction of displacements. This program, described earlier, uses scaling and translation to simulate displacements.

Fourth, using the registered position of the board as the reference point, the operator determines the parameters to move to the next inspection point. These parameters may include movements in X, Y and Z axes and the translation and scale factors required to window the next inspection point. The operator observes the monitor and uses the controller to direct movements in the X, Y and Z axes for this manual positioning.

Fifth, the operator provides a training code to identify the new inspection point and proceeds in the same manner as in the third step above. The operator continues until all inspection points have been located and training codes assigned.

Sixth, the operator monitors the initial operation of the inspection task. A simple program in the controller initiates programmed actions during operation depending upon the response codes. These actions may include: initiate the inspection task if a part is present, inform the operator of a defective inspection point, initiate a move to the next inspection point, signal when the inspection task is completed, allow the operator to update training for an inspection point if a failure indication is determined by the operator to be an acceptable variation. A defect at an inspection point is determined from the total counts accumulated in the histogram for the code assigned to that point. If the count is less than that observed during training, the point is defective.

The preferred embodiment of pattern processor 202 shown in FIG. 9 is designed using the standard IEEE-796 (Intel multibus) architecture. Each block drawn in solid lines within pattern processor 202 represents a single printed circuit board. The size of each board and the edge connectors for ports P1 and P2 conform to the IEEE 796 standard. Port P3 is a custom designed port for pattern processor 202.

Port P1 of pattern processor 202 has eighty-six contacts and provides the setup and control communications for pattern processor 202. Controller Interface board 218 links controller 206 to port P1 so that individual functions of circuit boards 214, 216, 218, 220, 222, 224 and 226 can be controlled by controller 206.

Port P2 has sixty contacts and provides the high speed access to image buffer board 216 and response memory board 222. This high speed access port is controlled by dedicated logic on address sequencer board 224 and on response detector/training board 226. Each board 224 and 226, therefore, can be considered as having its own high speed port to its dedicated memory.

Port P3 is used to send the address stream generated by address sequencer board 224 to response detector/training board 226.

Ports P1, P2 and P3 are input/output (I/O) edge or pin contacts on the printed circuit boards. In addition to the edge contacts, there are video input and output connectors on video digitizer board 214 and an IEEE-488 connector on controller interface board 218.

Basically, the internal architecture of pattern processor 202 utilizes the IEEE-796 standard to permit compatibility with a wide range of off-the-shelf printed circuit boards for memory, terminal interfaces, microcomputer boards, graphics, and many other functions of digital systems. Of the seven circuit boards 214–226, only address sequencer board 224 and response detector/training board 226 are custom designed. Video digitizer board 214, microcomputer board 220, controller interface board 218, and response memory board 222 are preferably commercially available circuit boards. In addition, image buffer board 216 is preferably a commercially available circuit board which is modified only so far as necessary to permit high speed access through the P2 port.

Externally, pattern processor 202 preferably interfaces to video camera 204 and video monitor 208 utilizing an industry-wide video standard. This permits use of a wide range of different cameras, monitors, and recorders with pattern processor 202.

In addition, controller interface board 218 utilizes the IEEE-488 standard, which is widely used in manufacturing environments for process control and testing. Pattern processor 202, therefore, is capable of use in conjunction with a wide variety of existing manufacturing systems which already utilize the IEEE-488 interface.

(A) Video Digitizer Board 214

Video digitizer board 214 digitizes the analog video signal from video camera 204 and makes the digitized data available for storage in image buffer board 216. An entire image of information (called a frame) is digitized thirty times a second. Video digitizer board 214 also converts the digitized data stored in image buffer board 216 back to an analog video signal for display on video monitor 208. Video monitor 208, therefore, displays the contents of image buffer board 216. The setup and control functions of video digitizer board 214 are directed from controller 206 through control interface board 218 and the P1 port.

Image buffer board 216 grabs a frame of data from video digitizer board 214 at its option. A cable 236 is connected directly between on-board connectors video digitizer board 214 and image buffer board 216 to permit the transfer of digitized data.

In one preferred embodiment of the present invention, video digitizer board 214 is a Model VAF-512 video digitizer circuit board from Matrox Company. The Model VAF-512 converts a frame of video into 128K points each having sixteen possible levels of intensity (i.e. sixteen grey levels).

In another embodiment, video digitizer board 210 is a Model VG-121 digitizer circuit board from Data Cube Corporation. The Model VG-121 converts a frame of video into 128K points and sixty-four grey levels. The VG-121 circuit board includes both a video digitizer and an image buffer on the same circuit board, and in that case Video digitizer board 214 and image buffer board 216 form a single circuit board.

(B) Image Buffer Board 216

Image buffer board 216 grabs a frame of data from video digitizer board 214, stores the data in its memory, and makes the data available to address sequencer board 224 through the P2 port. Each element stored in image buffer board 216 is addressable through the address lines of the P2 port.

Many commercially available image buffer boards also provide some graphics functions. These graphics functions permit the image on video monitor 208 to be manipulated. For example, the operator may want to inspect subregions of an image more closely. With the assistance of graphics functions such as line drawing or zooming, the operator can more easily define subregions for more detailed inspection by pattern processor 202. In preferred embodiments, image buffer board 216 (with graphics functions) is a Matrox Model RGB Graph or a Data Cube Model VG121. The only modifications required to either of these boards for use in pattern processor 202 are those required to provide high speed access through the P2 ports.

(C) Controller Interface Board 218/Microcomputer Board 220

These two circuit boards work together to interface the standard IEEE-488 cable 232 from controller 206 to the multibus P1 port. Microcomputer board 220 intercepts commands from controller 206, via the controller interface 218, and loads the appropriate memory registers located on the various boards which are connected to port P1. In addition, microcomputer board 220 receives information from the boards and reformats it to send it to controller 206 via controller interface 218 and cable 232.

Microcomputer board 220 also provides signals through port P1 to control the refresh time of image buffer board 216. In addition, microcomputer board 220 provides signals in the form of control words via the P1 port to response detector/training board 226 to control double buffering swap times for the response detector. Further, microcomputer board 220 can be used to perform a variety of analysis tasks on the histogram data from the response detector training board 226.

(D) Response Memory Board 222

The response memory board 222 is preferably a commercially available multibus compatible read/write random access memory having a capacity of, for example, 512K words. Response memory board 222 is capable of being accessed at high speed through both the P1 and P2 multibus ports. Response memory board 222 is available, for example, from Microbar (Model DBR50).

Figure 10A:
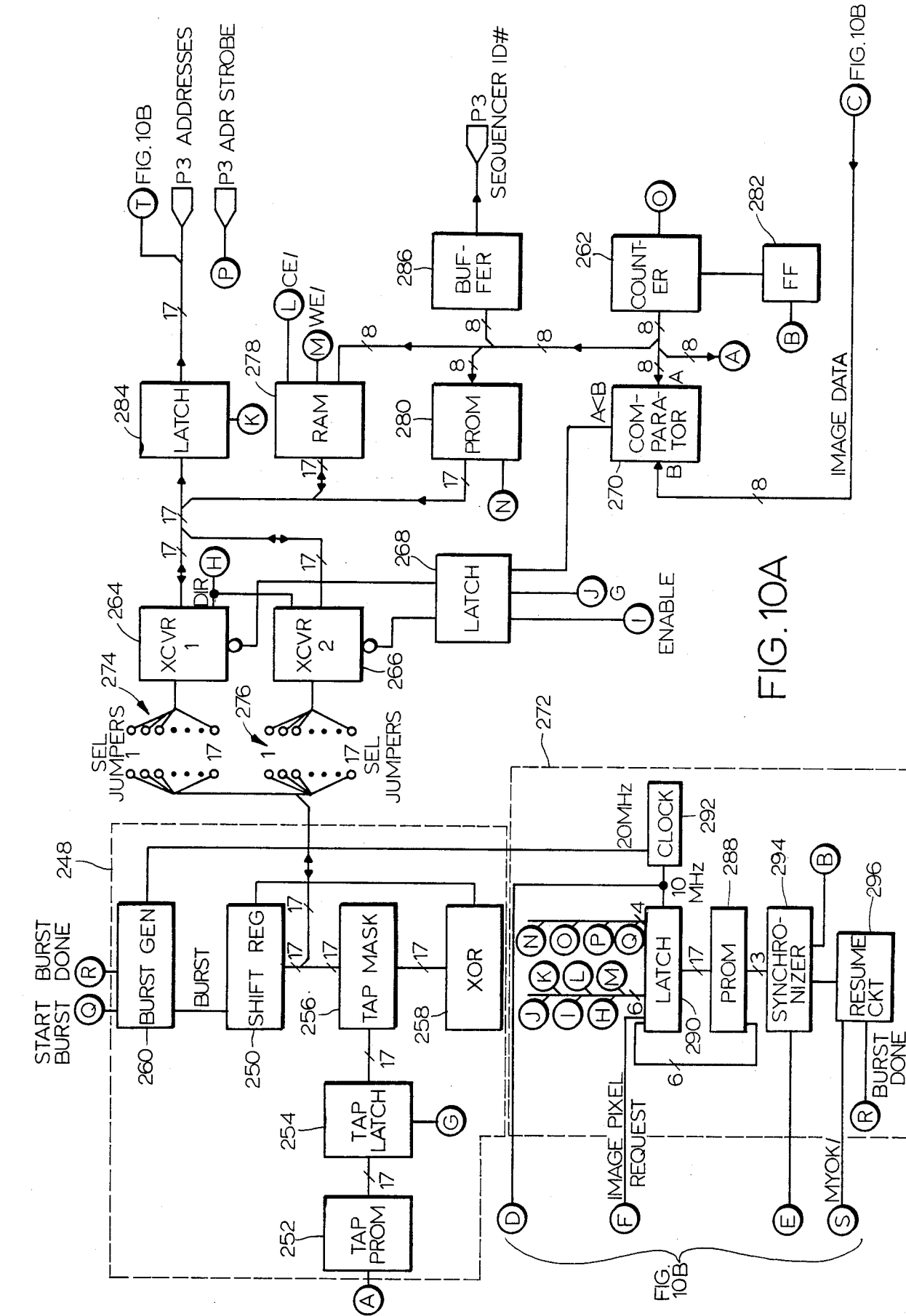
FIGS. 10A and 10B are a block diagram of the address sequencer board of the pattern processor of FIG. 9.
Figure 10B:
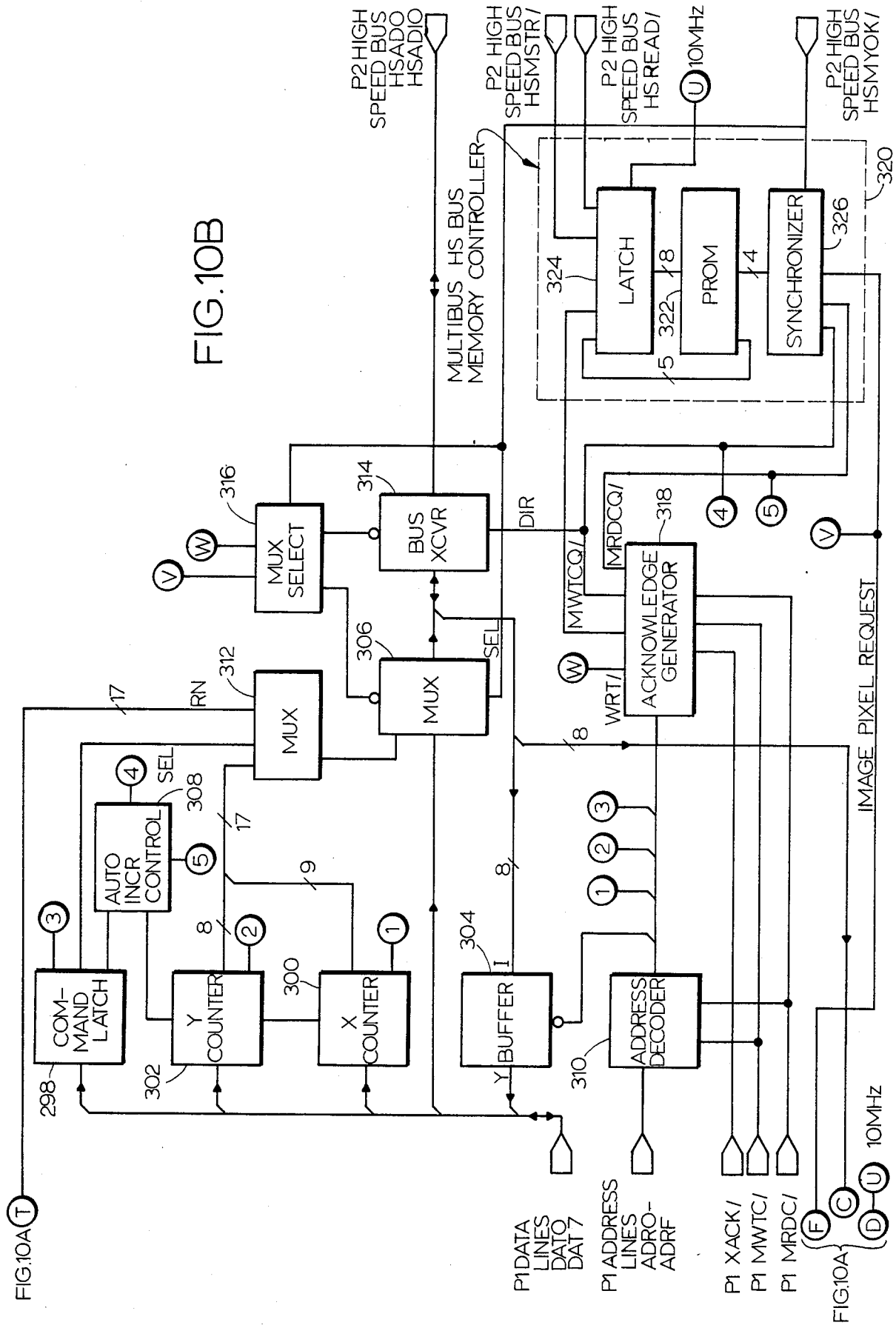

(E) Address Sequencer Board 224 (FIGS. 10A and 10B)

Address sequencer board 224 is used to generate addresses for access of individual pixels in image buffer board 216. The "next" address in an address sequence is determined by a multibit number from a pseudorandom number generator 248 and the grey level of the "present" pixel. If the grey level of the present pixel is above a reference value, one combination of the number's bits will be used as the next address; if the grey level is equal to or below the reference value, another combination of the bits is used. Each grey level can therefore be represented as a binary image, i.e. either the pixel's value is above or below/equal the reference value. Each grey level image has at least one address sequencer assigned to it. If the same address sequencer (same tap locations) is assigned to each level, an immunity to variations to general light intensity is exhibited for visual patterns. This is an important property and occurs because a specific grey level image will cause the same address loops to be generated even though it shifts to different address sequencers due to a change in general light intensity. The operation of address sequencer board 224 is consistent; i.e. the same number and grey level always generate the same next address. As discussed previously, this characteristic is a key to the generation of address loops which are used by pattern processor 202 to associate a training code with an input image.

As shown in FIG. 10A, shift register 250, tap PROM 252, tap latch 254, tap mask 256, exclusive OR (XOR) network 258, and burst generator 260 form pseudorandom number generator 248. Shift register 250 is a seventeen stage parallel-in/parallel-out shift register. Exclusive OR feedback from specific shift register stages is provided through tap mask 256 and XOR network 258. Any combination of taps can be selected to provide feedback to shift register 250. Tap mask 256 gates the output lines programmed in tap PROM 252 and supplied through tap latch 254 to XOR network 258. The output of XOR network 258 is fed back to the first stage of shift register 250. Tap PROM 252 is addressed by sequencer ID number counter 262. A multiple shift is used to generate each pseudorandom number to ensure randomness. Burst generator 256 is used to generate a high speed burst of a predetermined number of clock pulses for advancing shift register 250.

By using programmable taps, the characteristics of pseudorandom number generator 248 can be changed in a known fashion. By programming the tap within tap PROM 252 in a multiplexed fashion, the effect is that of many individual pseudorandom number generators each in turn accessing image buffer board 216.

Transceivers 264 and 266, latch 268, and comparator 270 form a select circuit for selecting one of two available combinations of the bits of the pseudorandom number contained in shift register 250, depending upon the grey level value of the present pixel. If the grey level value is greater than or equal to the number stored in counter 262, transceiver 264 is selected. If the present pixel has a grey level value which is less than the number in counter 262, transceiver 266 is selected. Comparator 270 performs this comparison, and latch 268 enables the appropriate transceiver 264 or 266 at the appropriate time, as determined by generator control unit 272. Latch 268 is designed to avoid output clashes between transceivers 264 and 266.

Select jumpers 274 and 276 connect shift register 250 with transceivers 264 and 266, respectively. Select jumpers 274 and 276 are jumpers so that each transceiver 264 and 266 delivers a different scrambled version of the number contained in shift register 250.

In some embodiments of the present invention, comparator 270 is disconnected from chosen least significant bits of counter 262. This allows multiple cycles of pseudorandom number generator 248 on each grey level plane. In that case, the number contained in counter 262 represents the sequencer ID number, while the bits of that number which are supplied to comparator 270 represent the current grey level plane.

RAM 278 and PROM 280 are involved with "seed" storage. To ensure an orderly and repeatable start from power-up, a set of initial random numbers or "seeds" are stored in PROM 280. These seeds form the very first "present" or "current" address for each of the sequencer ID numbers defined by counter 262. After the first pass through the sequencer ID numbers, the "next address" random numbers having been stored are subsequently retrieved from RAM 278. Flipflop 282 is set after the first pass, and directs subsequent read accessing to RAM 278. Latch 284 serves to hold the present address (random number) for use in accessing image buffer board 216. Buffer 286 buffers the counter 262 and directs the sequence ID number to port P3, where it is connected to response detector/training board 226.

Generator control unit 272 includes PROM 288, latch 290, clock 292, synchronizer 294 and resume circuit 296. The outputs of PROM 288 are latched by latch 290 with each clock pulse from clock 292. Six lines from latch 290 are brought around to address lines of PROM 288, and allow control unit 272 to "cycle". Other outputs of latch 290 (which are labeled with letters "H" through "Q", are routed to various control points on address sequencer board 224. Outputs H-Q perform such functions as loading and unloading shift register 250 (output Q), selecting the direction of transceivers 264 and 266 (output H), advancing the sequencers ID number contained in counter 262 (output O), controlling seed storage RAM 278 (outputs L and M), controlling seed storage PROM 280 (output N), and controlling latch 268 (outputs I and J). Synchronizer 294 is an optional circuit used to synchronize external signals such as memory acknowledge signals to local clock 292. Resume circuit 296 gates together the acknowledge signal MYOK/ and the BURST DONE signal to restart generator control unit 272 after programmed halts.

During each operating cycle, control unit 272 first causes counter 262 to advance to a new sequencer ID number count. Control unit 272 then causes the stored "seed" address corresponding to the new sequencer ID number to be loaded from RAM 278 (or PROM 280 during initial startup) into latch 284. The output of latch 284 is the address which is supplied through port P3 to response detector/training board 226 and through port P2 (see FIG. 10B) to image buffer board 216.

The image data which is received by comparator 270 is a sample value corresponding to the address contained in latch 284. Comparator 270 compares the image data with the grey level count from counter 262 and sets latch 268 and enables the selected transceiver 264,266 to load the seed address from RAM 278 (or PROM 280) into shift register 250.

The sequencer ID number from counter 262 is supplied to tap PROM 252. Control unit 272 enables tap latch 254 to latch the taps from tap PROM 252 which correspond to the sequencer ID number.

Control unit 272 then starts burst generator 260 to cause the contents of shift register 250 to be shifted. During the shifting, feedback to the first stage of shift register 250 is provided by XOR circuit 258 based upon the selected taps.

When the shifting is completed, control unit 272 reverses the direction of the selected transceiver 264 or 266. The new number contained in shift register 250 is scrambled by jumpers 274 or 276 and sent through the selected transceiver 264 or 266 to RAM 278 where it is stored in the location corresponding to the sequencer ID number for use as the address the next time counter 262 returns to that sequencer ID number. The cycle is then complete, and control unit 272 is ready to initiate the next cycle by advancing counter 262 to another sequencer ID number.

The remainder of the address sequencer board 224 is shown in FIG. 10B. Command latch 298 is used by the operator to hold command signals for selecting operating modes of address sequencer board 224. Command latch 298 enables functions such as an auto increment mode, random number mode, user read/write mode, and so on. Command latch 298 resides at a system address in the multibus address space.

X counter 300 and Y counter 302 are used when the operator wishes to perform a direct read or write of the image buffer board 216. Counters 300 and 302 reside within the multibus system address space. To perform a read or write, the operator loads an address into X counter 300 and Y counter 302 (which is similar to X and Y coordinates) and does a read from or a write to the transfer address. Buffer 304 delivers the pixel value during a read operation. During a write operation, the data is multiplexed into image buffer board 216 by multiplexer (MUX) 306. Auto increment control 308 provides an auto increment function which is available in the event that the operator wishes to do reads or writes to sequential memory locations within image buffer board 216.

Address decoder 310 is used to generate chip selects (or enables) for the various circuits which are addressable by the multibus. The base address is set by jumpers (not shown).

Multiplexer 306, multiplexer 312, bus transceiver 314 and multiplexer select circuit 316 provide a multiplexed image buffer interface (i.e. address and data are time-shared on the same lines of port P2). Multiplexer 312 is used to choose either random numbers or the numbers contained in counters 300 and 302 as the address source. Multiplexer 306 is used to select either the address source (multiplexer 312) or the data source (the P1 data lines) for presentation to bus transceiver 314. Bus transceiver 314 is used to drive the image buffer bus (port P2). Multiplexer select circuit 316 enables multiplexer 306 and bus transceiver 314 in such a fashion as to avoid output clashes between multiplexer 306 and bus transceiver 314.

Acknowledge generator 318 is used to generate the XACK/ signal for the multibus port P1 and to qualify the multibus read and write signals (MRDC/ and MWTC/) for use in image buffer memory transfers.

High speed bus memory controller 320 includes PROM 322, latch 324, and synchronizer 326. High speed bus memory controller 320 generates the proper control signals when an access to image buffer board 216 is required. These involve a read, a strobe and an acknowledge line (HSREAD., HSMSTR/, and HSMYOK/, respectively) for the image buffer, and an acknowledge signal for the multibus. An image memory cycle can be initiated either from a multibus access to the image, or from a random number access.

The outputs of PROM 322 are latched by latch 324 with each clock pulse received from clock 292. Five lines of latch 324 are brought around to address lines of PROM 322. These five lines allow high speed bus memory controller 320 to cycle. Other outputs of latch 324 are used for the various memory interface functions. Synchronizer 326 is an optional circuit used to synchronize external signals, such as HSMYOK/, to the local clock.

In summary, the address sequencer board 224 which is shown in detail in FIGS. 10A and 10B generates addresses which access individual pixels of the image contained in image buffer board 216. The next address in the address sequence is determined by pseudorandom number generator 248 together with the grey level of the present pixel which is supplied as image data to comparator 270. If the grey level of the present pixel is above the reference value derived from the value in counter 262, transceiver 264 is selected to provide one combination of the bits contained in shift register 250. If the grey level is less than the grey level reference value, transceiver 266 is selected, which provides a different combination of the bits contained in shift register 250. The reference value generated by counter 262, therefore, defines "grey level planes", each of which can be processed by address sequencer board 224. In addition, the count contained in counter 262 represents a sequencer ID number used to control pseudorandom number generator 248.

Pseudorandom number generator 248 includes shift register 250 together with exclusive OR feedback taken from specific shift register stages by tap mask 255 and exclusive OR circuit 258. In this embodiment, the taps are chosen by tap PROM 252 based on the sequencer ID number so as to generate maximal length sequences. By using programmable taps, address sequencer board 224 can change the characteristics of pseudorandom number generator 248 in a known fashion. By programming the taps in a multiplexed fashion, the effect is that of many individual random number generators each in turn accessing the image buffer board 216. This greatly enhances the resolution of pattern processor 202, since the multiplexed random number generators are in effect operating in parallel. Seed storage RAM 278 is provided to save the generated address until its next turn in the multiplex cycle. This ensures that the operation of pseudorandom number generator 248 is consistent and predictable.

Address sequencer board 224 also includes circuitry necessary to manage the interface to image buffer board 216, to multibus ports P1 and P2, and to response detector/training board 226. By means of X and Y counters 300, 302 and the related circuitry shown in FIG. 7B, the operator is permitted to write to or read from image buffer board 216. This is particularly useful in testing image buffer board 216 and also in loading up contrived image patterns.

Figure 11:
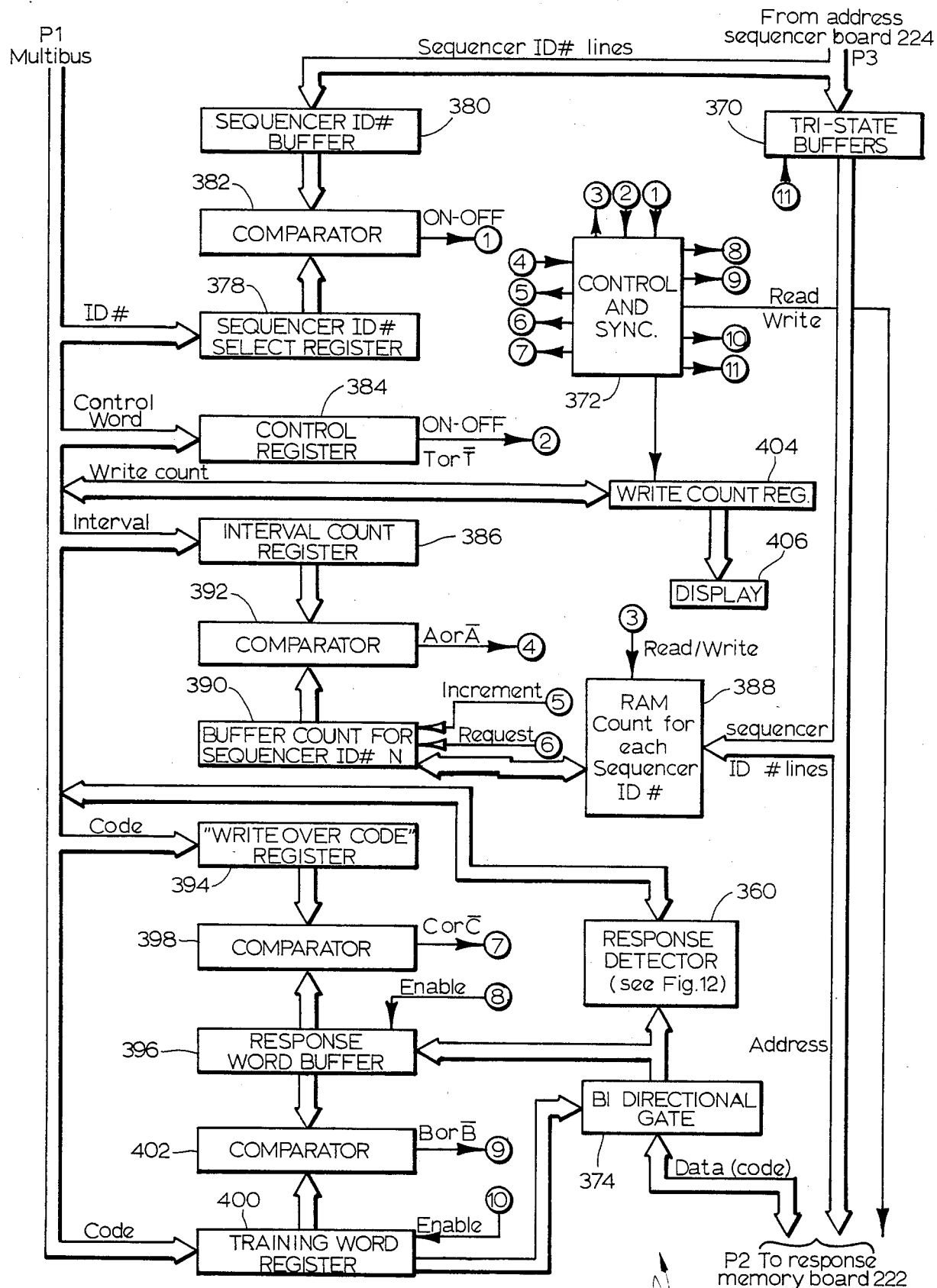
FIG. 11 is a block diagram of the training controller of the pattern processor of FIG. 9.
Figure 12:
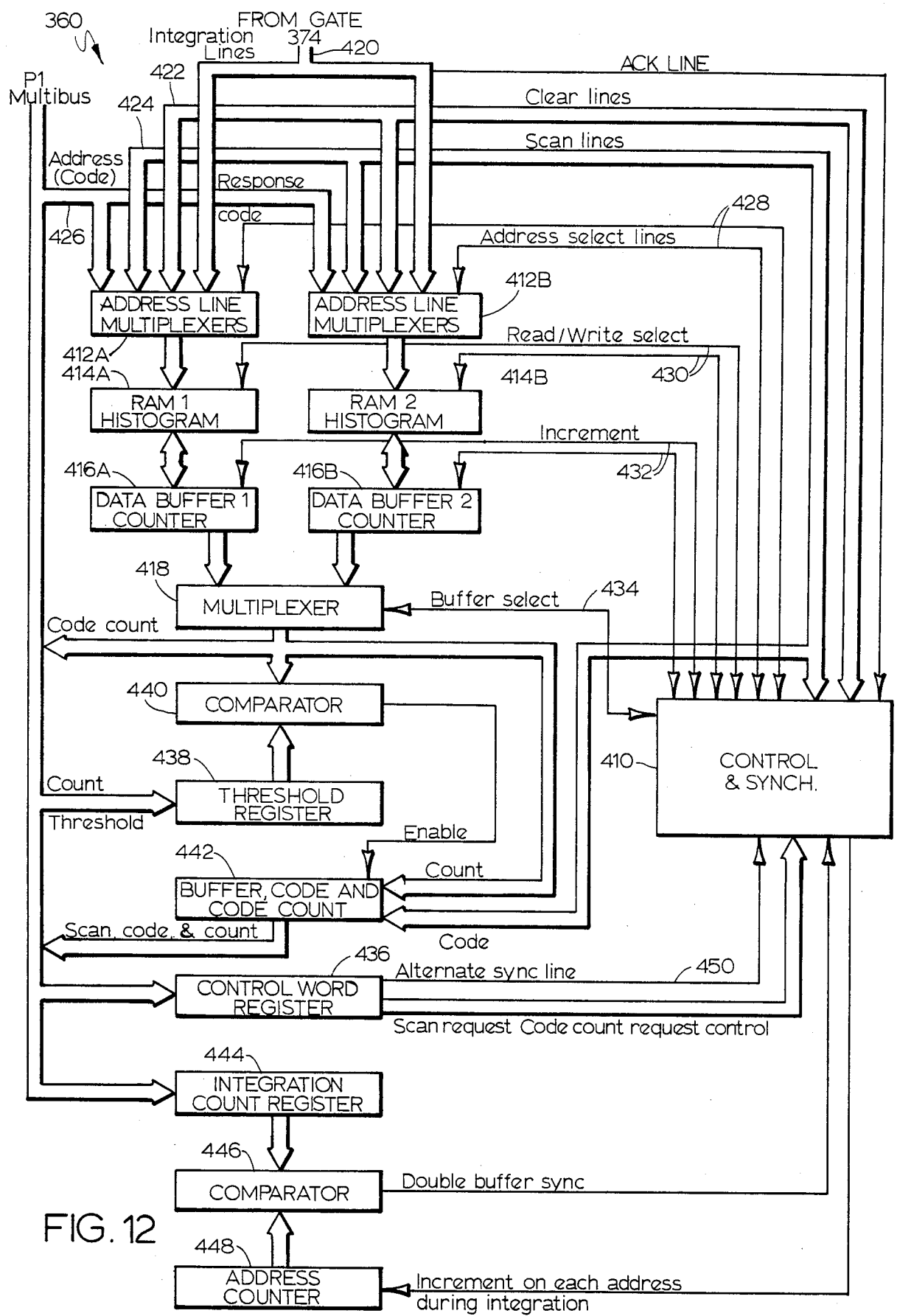
FIG. 12 is a block diagram of the response detector of the pattern processor of FIG. 9.

(F) Response Detector/Training Board 226 (FIGS. 11 and 12)

Response detector/training board 226 consists of two main sections: training controller 350 shown in FIG. 8 and response detector 360 shown in FIG. 9. Training controller 350 writes to response memory board 222, while response detector 360 reads from response memory board 222.

To understand the operation of training controller 350 and response detector 360, the nature of the address stream from address sequencer board 224 (which is supplied on port P3) must first be considered. As described previously with reference to FIGS. 10A and 10B, address sequencer board 224 functions as though it consisted of many individual address sequencers operating in a multiplexed fashion. Each sequencer has an identifying number (i.e. the sequencer ID number from buffer 286) and each sequencer's output address is interleaved with the other output addresses. The P3 port lines include address lines, sequencer ID lines, and control lines. For example, if sixteen address sequencers are active, the sequencer ID number from buffer 286 increments from "0" to "15" and back to "0" as each sequencer in turn places its output in the address stream. In general, each sequencer is associated with one grey level in the image, although as discussed previously, it is possible to provide more than one sequencer per grey level if desired. Each sequencer can be considered to be operating independently of the other sequencers and thus forming its own address loops.

Response detector/training board 226 receives the address stream and its associated control lines from address sequencer board 224 through the P3 port. The address stream occurs continuously (except during image frame grabbing if image buffer board 216 does not have double buffering capabilities). Response detector/training board 226 accepts and synchronizes with the address stream. When the address stream stops, response detector/training board 226 stops. If response detector/training board 226 stops, it has no effect on the address stream or on address sequencer board 226. In other words, response detector/training board 226 is entirely passive with respect to address sequencer board 224. This allows response detector/training board 226 to operate as an independent module.

(i) Training Controller 350 (FIG. 11)

The basic function of training controller 350 (FIG. 11) is to write training words into response memory board 222. Most of the circuitry of training controller 350 involves determining when in the address stream from address sequencer board 224 the writing of training words should occur. Commands for setup and control originate from controller 206 and are sent via the multibus P1 port to various registers of training controller 350. Microcomputer board 220 controls the actual loading of the various registers of training controller 350, and the registers are essentially memory locations within the addressable memory space of microcomputer board 220.

Training controller 350 receives control lines, address lines, and sequencer ID number lines from the P3 port. Data, address and read/write lines are provided through the P2 port to response memory board 222.

Tristate buffers 370 are connected between port P3 and the address lines of port P2. When tristate buffers 370 are activated by control and synchronization circuit 372, they allow an address (or addresses) from port P3 to pass through to port P2, and thus on to response memory board 222.

In a preferred embodiment, control and synchronization circuit 372 is a programmable read only memory (PROM) which stores microcode. The PROM acts as a finite state machine which selects the next state of its output lines as a function of the current combination of states of its input lines.

Bidirectional gate 374 interfaces training controller 350 and response detector 360 with the data lines of the P2 port. The read/write control line 376 from control and synchronization circuit 372 is supplied through the P2 port to response memory board 222, and determines whether data is flowing from training controller 350 to response memory board 222, or whether data is flowing from response memory board 222 through bidirectional gate 374 to response detector 360.

Sequencer ID number select register 378 holds the sequencer ID number whose address output is currently being trained. The ID number is loaded into register 378 from the P1 port, and is compared with the current sequencer ID number in sequencer ID number buffer 380 by comparator 382. The output of comparator 382 is an ON/OFF signal which is supplied to control and synchronization circuit 372. When the ON/OFF signal indicates an ON state, tristate buffers 370 are turned on by control and synchronization circuit 372 and the address or addresses received from port P3 are passed through to port P2 and response memory board 222.

The effect of register 378, buffer 380 and comparator 382 is to allow operation by a single sequencer of address sequencer board 224, the address of which is interleaved in the address stream with addresses from other sequencers. As stated previously, address sequencer board 224 operates as multiple address sequencers and interleaves their addresses in the address stream. This permits training or response detection to occur using only one sequencer at a time, and permits important diagnostic information to be gathered. In normal operation, the ON/OFF signal is forced ON, enabling the entire address stream to pass through buffers 370.

Control register 384 receives a control word from the P1 port, and sets up various options. The output of control register 384 is supplied to control and synchronization circuit 372. One bit in the control word controls an ON/OFF signal, which determines whether tristate buffers 370 are turned on or turned off. Another bit of the control word, designated as T and $\overline{T}$ causes control and synchronization circuit 372 to place training controller 350 in or out of the training mode. When the bit is "T", the training mode is in operation, and training words can be written into response memory board 222. On the other hand, when the bit is "$\overline{T}$", the training mode is not in operation, and training words cannot be written into response memory board 222.

Interval count register 384 controls the number of response memory locations used during training. Only as many memory locations need to be used as are required to distinguish which address loop each address sequencer is in. Register 386 identifies the address interval in the address stream (considering the address stream from each address sequencer ID number separately) that the training word is assgned to response memory board 222. For example, if register 386 is set to ten, then every tenth address from each sequencer will have the training word assigned to that address in response memory board 222.

RAM 388 contains a memory location for each sequencer ID number and, in fact, the ID number serves as the address to RAM 388. Each location serves as a counter to count the number of occurrences of each sequencer ID number. The contents of RAM 388 are read into buffer 390 and are compared to the contents of interval count register 386 by comparator 392. The output of comparator 392 is "A" if the count for occurrences of a particular sequencer ID number N in buffer 390 is less than the interval count contained in register 386. Conversely, the output of comparator 392 is "$\overline{A}$" if the count for occurrences of sequencer ID number N contained in buffer 390 is greater than or equal to the interval count contained in register 386. The output (A or $\overline{A}$) of comparator 390 is supplied to control and synchronization circuit 372.

The count for each sequencer ID number can be incremented or reset by control and synchronization circuit 372, which supplies Increment and Reset inputs to buffer 390. In addition, the count for each sequencer ID number can be written back to RAM 388 by control and synchronization circuit 372 through a Read/Write input to RAM 388.

Write over code register 394 identifies a code which has already been written into response memory board 222 but which can be written over by a new training word. This feature is useful as response memory board 222 becomes filled, and when corrections are to be made to existing codes in response memory board 222. The response word is read directly from the response memory board 222 as it is addressed by the address stream, and is supplied through bidirectional gate 374 to response word buffer 396. Comparator 398 compares the response word contained in buffer 396 with the write over code contained in register 394. The output of comparator 398, which is supplied to control and synchronization circuit 372 is "C" if the current response word equals the write over code. The output of comparator 398 is "$\overline{C}$" if the current response word does not equal the write over code.

Under normal conditions, the write over code is the code to designate an empty location in response memory board 222. In other words, the write over code is the same code used to preset the entire response memory board 222. The write over feature can be disabled to allow any response word to be changed.

Training word register 400 holds the training code to be written to response memory board 322. The training code in training word register 400 is compared to the current response word in buffer 396 by comparator 402, to determine if the training code is already stored at the currently addressed location. If the training code is already stored at this location, the count for the current sequencer ID number is reset and stored in RAM 388. This helps maintain the desired interval between assignment of the training code to response memory board 222.

The output of comparator 402, which is supplied to control and synchronization circuit 372, is "B" if the training code equals the current response word. The output of comparator 402 is "$\overline{B}$" if the training code is not equal to the current response word.

Write count register 404 can be read from or written to by controller 206 through the multibus P1 port. Register 404 indicates how many times a training code has been written to response memory board 222. This number is also displayed by display 406. The number contained in register 404 is important, because it can indicate the approximate length of the address loop for each address sequencer ID number, if the interval size is known and only one sequencer ID number is active at a time. For example, if the assignment interval set by interval count register 386 is ten, if the sequencer ID Number "N" is activated, and if the number in register 404 is thirty, then the address loop length for sequencer ID Number N is approximately three hundred. The write count contained in registered 404 may not always indicate loop length exactly, due to overlap of different loops. It does, however, provide an approximate measure of loop length. The write count contained in register 404 can also be accumulated by controller 206 to indicate how much of response memory board 222 is being used.

Control and synchronization circuit 372 causes a training code to be written to response memory board 222 when the following condition is met: A AND C AND T. In other words, this means that the count for occurrence of address sequencer ID Number N contained in buffer 390 is greater than or equal to interval count contained in register 386; and the current response word contained in buffer 396 equals the write over code contained in register 394; and training controller 350 is in the training mode.

Control and synchronization circuit 372 clears the count in buffer 390 and writes to RAM 388 if either (1) a training code is written to response memory board 222, or (2) the same training code is already at the current address location in response memory board 222. This condition can be expressed by: A AND C AND T OR B, where B is the output of comparator 402, and indicates that the training code contained in training word register 400 equals the response word contained in buffer 396.

(ii) Response Detector 360 (FIG. 12)

Response detector 360 determines (i.e. detects) the identity (i.e. response) of the image presented to pattern processor 202. It does so by continually reading the contents of the response memory board 222 which are addressed by the address stream from address sequencer board 224 and by identifying the most frequently occurring codes being read. If the image present at image buffer board 216 is the same or similar to the image presented during training, then the address stream will be similar, and the response detector 360 will identify the code which was used during training. For a static image, the address stream will always be repetitive and will contain a small subset of the total set of possible addresses. As long as the image is present, therefore, the same set of addresses will be accessed and the same response code will be detected.

Response detector 360 receives through bidirectional gate 374 (FIG. 11) only the contents of response memory board 222 which are addressed by the address stream. Response detector 360 does not deal with the address stream itself. As the address stream is controlled (for example turned on or off with tristate buffers 370 of FIG. 11), the response codes sent to response detector 360 through bidirectional gate 374 also turn on and off.

Response detector 360 is set up and controlled by commands which are sent from controller 206 through port P1 and which are stored in various registers of response detector 360. The registers are within the addressable memory space of microcomputer board 220, and read and write operations occur through the multibus P1 port. The operation of response detector 360 is synchronized and controlled by control and synchronization circuit 410. Among the functions controlled by circuit 410 include clearing selected addresses, scanning addresses, and synchronization of the other circuits. In preferred embodiments, control and synchronization circuit 410 is a PROM containing microcode which operates as a finite state machine. The next state of the outputs of circuit 410 are a function of the current combination of states of its inputs.

Response detector 360 uses a double buffering arrangement for receiving the response code read out from response memory board 222 and for providing a response code to controller 206 through the P1 port. The double buffering arrangement includes address line multiplexers 412A and 412B, first and second random access memories (RAMS) 414A and 414B, data buffers 416A and 416B, and multiplexer 418.

First and second RAMs 414A and 414B are the key components in response detector 360. First and second RAMS 414A and 414B operate in a double buffer (i.e. flipflop) scheme so that one RAM is always available for response inquiries from controller 206 while the other RAM is processing the response code stream which is being received from response memory board 222 through bidirectional gate 374 (FIG. 11). The response code stream serves as a sequence of addresses for RAMs 414A and 414B. For example, if there are 256 possible different training codes, there will also be 256 possible response codes. In this example, first and second RAMs 414A and 414B preferably are 256×16 bit RAMs, and each response code addresses a specific location in RAM 414A (or 414B), depending on which RAM is processing the response codes. That RAM increments the contents of each addressed location, where the address is the response code. Since the occurrence of a response code increments its location in RAM 414A (or 414B), a histogram is formed. The period over which the processing RAM 414A (or 414B) is accumulating counts is called the integration count, and lines 420 which provide the response code stream from bidirectional gate 374 are called the integration lines.

There are four ways to address RAMs 414A and 414B: integration lines 420, clear lines 422, scan lines 424, and address lines 426. Lines 420, 422, 424 and 426 are all provided to address line multiplexers 412A and 412B. Control and synchronization circuit 410 controls operation of multiplexers 412A and 412B through address select lines 428.

As stated previously, integration lines 420 provide the response code stream which was supplied from response memory board 222 through bidirectional gate 374. Clear lines 422 are received from control and synchronization circuit 410, and cycle through the RAM addresses to clear the contents of RAM 414A or 414B. Scan lines 424 are also received from control and synchronization circuit 410. They permit control and synchronization circuit 410 to sequence through the RAM 414A, 414B for the purpose of sending the contents of the RAMs to controller 206. Address lines 426 are received from port P1 of the multibus, and permit direct addressing of RAMs 414A and 414B by controller 206. RAMs 414A and 414B are preferably included in the memory space of microcomputer board 220.

Typically, one RAM (for example 414A) is clearing its memory and then accumulating counts (i.e. integrating) while the other RAM (in this example 414B) is available for access by controller 206 via multibus port P2. The selection of which RAM is integrating and which RAM is available for access by controller 206 is controlled by control and synchronization circuit 410 by means of address select lines 428, read/write select lines 430, increment lines 432, and buffer select line 434. Controller 206 provides control commands to control and synchronization circuit 410 by loading a control word through port P1 into control word register 436.

Controller 206 can directly access RAM 414A or 414B by sending the response code (which corresponds to an address of the RAM 414A or 414B), and in that case response detector 360 sends back the number of times that code has occurred during the last integration period. Alternatively, RAM 414A or 414B can be accessed by a scan request as part of the control word loaded in control word register 436. In that case, response director 360 sends back response codes and their number of occurrences if the number is above a preset threshold.

Threshold register 438, comparator 440, and buffer 442 are used during a scan operation, when controller 206 is requesting an indication of the identity of the image. During the scan operation, response detector 360 sends back through buffer 442 all codes which had a frequency of occurrence during the last integration period which was greater than the count threshold value contained in threshold register 438. The count threshold is provided by controller 206 through port P1. Each time comparator 440 determines that the count contained in multiplexer 418 is greater than the count threshold contained in threshold register 438, it provides an enable to buffer 442. The particular address from scan lines 424 and the count from multiplxer 418 are loaded into buffer 442, where they can be read by controller 206 through port P1.

The count threshold is clearly linked to the time over which counts are accumulated (i.e. the integratio time). Controller 206 specifies the integration time by loading an integration count into integration count register 444. Comparator 446 compares the integration count with an address count contained in address counter 448. The output of comparator 446 is a double buffer sync signal which is supplied to control and synchronization circuit 410. Address counter 448 is incremented by control and synchronization circuit 410 for each address which is received on integration lines 420. When the address count in counter 448 equals the integration count contained in register 444, the double buffer sync signal is supplied by comparator 446. This causes control and synchronization circuit 410 to end the integration period by reversing the double buffering scheme.

It is important to note that the integration count in most cases represents a real time interval, because the address rate (i.e. the rate of response codes received on integration lines 420) is constant. This direct relationship to real time cannot always be guaranteed, however, because the response code stream may be interrupted by a refresh of image buffer board 216 from camera 204 (in the case in which video camera 204 is not double buffered) or by a command from controller 206 which stops the address stream from address sequencer board 224.

To avoid the somewhat uncertain real time nature of the integration period, an alternative external synchronization is possible by means of alternate sync line 450, which is supplied from control register 436 to control and synchronization circuit 410. The control word which is loaded into control word register 436 preferably includes a bit which initiates a swap of the double buffering scheme. In general, this is synchronized with the frame rate of camera 204. As discussed previously, the control word is received from controller 206 and is loaded into control word register 436 by microcomputer board 220 through port P1.

(G) Increased Vocabulary and Resolution Capabilities

One important advantage of pattern processor 202 described in FIGS. 9 through 12 is the modular nature of its architecture. As discussed previously, response detector/training board 226 and response memory 222 are entirely passive with respect to address sequencer board 224. As a result, larger response vocabularies are possible by use of multiple response detector/training boards 226 and multiple corresponding response memory boards 222. Since the modules operate independently, they can all be placed on the multibus to provide additional response memory space and thus permit more space for different training codes.

Increased resolution can also be achieved by use of multiple image buffer boards 216 and address sequencer boards 224. Resolution is increased because additional sample points are continually being sampled from the same image, and the total address stream is therefore more sensitive to changes in fewer pixels (image element). Each additional module which includes an image buffer board 216 and an address sequencer board 224 normally requires an additional response detector/training board 226 and response memory board 222. This is because the response detector/training board 226 and the response memory board 222 described in FIGS. 9 through 12 accept only one address stream. The addition of another response detector/training board 226 and response memory board 222 in order to achieve greater resolution also provides a larger response vocabulary.

(H) Conclusion

The pattern processor of the present invention is an extremely powerful tool for a wide variety of different pattern recognition applications. The generation of address loops by the address sequencer provides a dramatic reduction in data which permits the association of a desired response with an image input. As a result, the present invention provides much faster response to complex input images than has been possible using conventional image processing techniques.

Although the present invention has been described with reference to preferred embodiments, workers skilled in the art will recognize that changes may be made in form and detail without departing from the spirit and scope of the invention.

What is claimed is:

1. A method of associating an input pattern with an output response, wherein the input pattern comprises a plurality of sample values, the method comprising:
   producing the sample values based upon the input pattern;
   storing the sample values of the input pattern in a first array of addressable locations;
   sequentially addressing the first array with a sequence of addresses in which each next address of the sequence is determined by a preceding address of the sequence and the sample value stored at the addressable location of the first array corresponding to the preceding address, so that a repetitive address loop which is a function of the input pattern is generated as long as the input pattern remains unchanged; and
   associating the output response with the address loop which is a function of the input pattern.

2. The method of claim 1 wherein associating the output response with the address loop comprises:
   sequentially addressing a second array of addressable locations with the sequence of addresses;
   storing a code representative of the output response at selected locations of the second array which are addressed by the sequence of addresses;
   reading codes from the locations of the second array addressed by the sequence of addresses; and
   providing the output response based upon the codes read from the second array.

3. The method of claim 1 wherein each next address of the sequence has a plurality of possible address values based upon the preceding address, and wherein the next address is selected from among the possible address values based upon a sample value related to the preceding address.

4. The method of claim 3 wherein each next address of the sequence has a plurality of possible address values based upon the preceding address, and wherein the next address is selected from among the possible address values based upon a sample value related to the preceding address.

5. A method of associating a pattern with an output response, the method comprising:
   sequentially sampling elements of the pattern to produce sample values representative of a characteristic of the elements sampled, the elements sampled being selected by a sequence of addresses in which each next address of the sequence is determined by a preceding address of the sequence and the sample value corresponding to the preceding address, so that a repetitive address loop which is a function of the pattern is generated as long as the pattern remains unchanged; and
   associating the output response with the address loop which is a function of the pattern.

6. The method of claim 5 wherein associating the output response with the address loop comprises:
   sequentially addressing a response memory with the sequence of addresses;
   storing a code representative of the output response at selected locations of the response memory which are addressed by the sequence;
   reading codes from locations of the response memory which are addressed by the sequence; and
   providing the output response based upon the codes read from the response memory.

7. A method of associating an input pattern with an output response, wherein the input pattern comprises a plurality of sample values, the method comprising:
   periodically storing the sample values of the input pattern at a first rate in a first array of addressable locations;
   sequentially addressing the first array at a second higher rate with a sequence of addresses in which each next address of the sequence is determined by a preceding address of the sequence and the sample value stored at the addressable location of the first array corresponding to the preceding address, so that a repetitive address loop which is a function of the input pattern is generated as long as the input pattern remains unchanged; and
   associating the output response with the address loop which is a function of the input pattern.

8. A pattern processing system for identifying an input pattern comprising:
   addressable means for providing, for each of a plurality of addressable locations, a sample value representative of a characteristic of an input pattern at that addressable location;
   address sequencer means for providing an address stream containing a sequence of addresses in which each next address of the sequence is determined by a preceding address and the sample value from the location corresponding to the preceding address; so that upon repetition of an address which has previously been provided in the sequence, the address stream cycles repetitively through an address loop which is a function of the input pattern for as long as the input pattern remains unchanged; and
   means responsive to the address stream for identifying the input pattern based upon the address loop which it causes to be provided by the address sequencer means.

9. The pattern processing system of claim 1 wherein the means responsive to the address stream comprises:

response memory means for storing codes in a second array of locations addressable by the address stream;

training controller means for selectively causing a predetermined training code to be associated with a selected input pattern to be written into the response memory means at locations of the second array addressed by the address stream when the selected input pattern is addressed by the address sequencer means; and response detector means for providing an an output response based upon codes read out from locations of the second array addressed by the address stream.

10. The pattern processing system of claim 9 wherein the response detector means provides the output response based upon frequency of the codes read out from the response memory means.

11. The pattern processing system of claim 8 wherein each next address of the sequence provided by the address sequencer means has a plurality of possible values based upon the preceding address, and wherein the sample value from the location corresponding to the preceding address determines which of the plurality of possible values is provided by the address sequencer means as the next address.

12. The pattern processing system of claim 11 wherein the address sequencer means comprises:
a plurality of address sequencers, each address sequencer providing a sequence of addresses in which the next address of the sequence has a plurality of possible values depending on a preceding address provided by the address sequencer, and in which the sample value from the preceding address provided by the address sequencer determines which of the plurality of possible values is provided as the next address, so that each address sequencer of the plurality generates an address loop which is a function of the input pattern; and
means for interleaving the sequence of addresses from the plurality of address sequences to produce the address stream.

13. The pattern processing system of claim 8 and further comprising:
means for modifying the address stream from the address sequencer means and providing the modified address stream to the addressable means.

14. The pattern processing system of claim 13 wherein the means for modifying the address stream comprises:
scaling means for scaling the addresses of the address stream.

15. The pattern processing system of claim 13 wherein the means for modifying the address stream comprises:
translation means for translating the addresses of the address stream.

16. The pattern processing system of claim 18 wherein the means responsive to the address stream comprises:
signature analysis circuit means for converting the address loops contained in the address stream to output codes.

17. A pattern processing system for identifying combinations of first and second input patterns, the system comprising:

first addressable means for providing first sample values representative of the first input pattern at a plurality of addressable locations;

second addressable means for providing second sample values representative of the second input pattern at a plurality of addressable locations;

first address sequencer means for providing a first address stream to the first addressable means, the first address stream containing a sequence of addresses in which each next address of the sequence is determined by a preceding address and the first sample value from the location corresponding to the preceding address;

second address sequencer means for providing a second address stream to the second addressable means, the second address stream containing a sequence of addresses in which each next address of the sequence is determined by a preceding address and the second sample value from the location corresponding to the preceding address; and means for identifying combinations of the first and second input patterns based upon the first and second streams.

18. The pattern processing system of claim 17 wherein the means for identifying comprises:
third addressable means for storing third sample values representative of a third input pattern at a plurality of addressable locations, the third sample values being based upon the addresses combined in the first and second address streams;
third address sequencer means for providing a third address stream containing a sequence of addresses in which each next address of the sequence is determined by a preceding address and the third sample value from the location corresponding to the preceding address; and
means responsive to the third address stream for identifying combinations of the first and second input patterns based upon repetitive address loops contained in the third address stream.

19. A pattern processing system comprising:
first addressable means for storing at a plurality of addressable locations sample values representative of an input pattern during a first temporal interval;
first address sequencer means for providing a first address stream containing a sequence of addresses in which each next address of the sequence is determined by the preceding address and the first sample value from a location of the first addressable means corresponding to the preceding address, so that upon repetition of an address which has previously been provided in the sequence, the address stream cycles repeatedly through an address loop which is a function of the input pattern;
second addressable means for storing at a plurality of addressable locations an array of second sample values representative of addresses contained in the first address stream during a second temporal interval which includes a plurality of first temporal intervals;
second address sequencer means for providing a second address stream containing a sequence of addresses in which each next address of the sequence is determined by a preceding address and the second sample value from the location corresponding to the preceding address, so that upon repetition of an address which has previously been provided in the sequence, the address stream cycles repetitively through an address loop which is a function of the array of second samle values; and means responsive to the second address stream for identifying the input pattern during the second temporal interval based upon an address loop contained in the second address stream.

20. A pattern processing system for identifying a pattern, the system comprising:

means for generating an address stream containing at least one sequence of addresses in which each next address of the sequence has a plurality of possible next address values based upon at least one preceding address, and wherein the next address is selected from among the possible next address values based upon at least one sample value related to the one preceding address so that at least one repetitive address loop which is a function of the pattern is generated;

means for providing, in response to each address of the address stream, a sample value representative of a characteristic of a sampled element of a pattern corresponding to that address; and means for identifying the pattern based upon the sequence of addresses generated when the pattern is sampled as a function of addresses of the address stream.

21. The pattern processing system of claim 20 wherein the means for providing sample values comprises:

source means for providing sample values representative of the characteristics of the sampled elements of a pattern; and buffer means for storing the sample values in a first array of locations addressable by the address stream, the buffer means providing the sample values to the means for generating the address stream in response to the address stream.

22. The pattern processing system of claim 20 wherein the means for identifying the pattern comprises:

response memory means for storing codes in locations addressable by the address stream;

training controller means for selectively causing a predetermined training code associated with the pattern to be written into the response memory means at locations addressed by the address stream when the pattern is addressed by the address sequencer means; and response detector means for providing an output response based upon codes read out from locations of the response memory means addressed by the address stream.

23. The pattern processing system of claim 22 wherein the response detector means provides the output response based upon frequency of the codes read out from the response memory means.

24. A pattern processing system for associating an input pattern comprising a plurality of sample values with an output response, the system comprising:

buffer means for storing the sample values of the input pattern in a first array of addressable locations;

response memory means for storing codes in a second array of addressable locations;

address sequencer means for providing a sequence of addresses, a next address of the sequence being determined by a preceding address and the sample value stored by the buffer means at the location corresponding to the preceding address; so that upon repetition of an address which has been previously provided, the sequence of addresses cycles repetitively through an address loop which is a function of the input pattern;

training controller means for selectively causing a predetermined code associated with the input pattern to be written into the response memory means at locations of the second array determined by the addresses of an address loop produced when the input pattern is stored by the buffer means and addressed by the address sequencer means; and response detector means for providing the output response based upon codes read out from locations of the second array addressed by the sequence of addresses provided by the address sequencer means.

25. The system of claim 24 and further comprising:

means for modifying the addresses provided by the address sequencer means and providing a sequence of modified addresses to the buffer means.

26. The system of claim 25 wherein the means for modifying comprises:

scaling means for modifying the addresses provided by the address sequencer means by a scaling factor.

27. The system of claim 25 wherein the means for modifying comprises:

translation means for modifying the addresses provided by the address sequencer means by a translation factor.

28. A pattern processing system for associating an input pattern comprising a plurality of sample values with an output response during a training mode and subsequently providing the output response when the input pattern is present during a subsequent identifying mode, the system comprising:

means for storing sample values of the input pattern in a first array of addressable locations;

means for storing codes in a second array of addressable locations;

means for providing a sequence of addresses corresponding to addressable locations of the first and second arrays, a next address of the sequence being determined by a preceding address of the sequence and the sample value stored at the location at the first array corresponding to the preceding address; so that upon repetition of an address which has been previously provided, the sequence of addresses cycles repetitively through an address loop which is a function of the input pattern and which includes a plurality of addresses, as long as the input pattern remains unchanged;

means for causing a predetermined code representative of the output response to be stored at selected locations of the second array determined by the addresses of the address loop produced during the training mode when the sample values of the input pattern are stored in the first array and are addressed by the sequence of addresses; and means for providing the output response based upon the codes read out from locations of the second array addressed by the sequence of addresses generated during the identifying mode when the sample values of the input pattern are stored in the first array and are addressed by the sequence of addresses.

29. A pattern processing system for associating an input pattern comprising a plurality of sample values with an output response, the system comprising:

buffer means for storing the sample values of the input pattern in a first array of addressable locations, the sample values stored being updated at a first rate;

response memory means for storing codes in a second array of addressable locations;

address sequencer means for providing a sequence of addresses at a second rate which is greater than the first rate, a next address of the sequence being determined by a preceding address and the sample value stored by the buffer means at the location corresponding to the preceding address; so that upon repetition of an address which has been previously provided, the sequence of addresses cycles repetitively through an address loop which is a function of the input pattern;

training controller means for selectively causing a predetermined code associated with the input pattern to be written into the response memory means at locations of the second array determined by the addresses of an address loop produced when the input pattern is stored by the buffer means and addressed by the address sequencer means; and response detector means for providing the output response based upon codes read out from locations of the second array addressed by the sequence of addresses provided by the address sequencer means.

30. A pattern processing system for associating an input pattern comprising a plurality of sample values with an output response during a training mode and subsequently providing the output response when the input pattern is present during a subsequent identifying mode, the system comprising:

means for periodically storing, at a first rate, sample values of the input pattern in a first array of addressable locations;

means for storing codes in a second array of addressable locations;

means for providing a sequence of addresses corresponding to addressable locations of the first and second arrays at a second rate which is greater than the first rate, a next address of the sequence being determined by a preceding address of the sequence and the sample value stored at the location at the first array corresponding to the preceding address; so that upon repetition of an address which has been previously provided, the sequence of addresses cycles repetitively through an address loop which is a function of the input pattern and which includes a plurality of addresses, as long as the input pattern remains unchanged;

means for causing a predetermined code representative of the output response to be stored at selected locations of the second array determined by the addresses of the address loop produced during the training mode when the sample values of the input pattern are stored in the first array and are addressed by the sequence of addresses; and means for providing the output response based upon the codes read out from locations of the second array addressed by the sequence of addresses generated during the identifying mode when the sample values of the input pattern are stored in the first array and are addressed by the sequence of addresses.

* * * * *